(12) United States Patent
McCallister

(10) Patent No.: US 10,340,987 B2
(45) Date of Patent: Jul. 2, 2019

(54) EXCURSION COMPENSATION IN MULTIPATH COMMUNICATION SYSTEMS WITH A CYCLIC PREFIX

(71) Applicant: CCIP, LLC, Scottsdale, AZ (US)

(72) Inventor: Ronald Duane McCallister, Scottsdale, AZ (US)

(73) Assignee: CCIP, LLC, Scottsdale, AZ (US)

(*) Notice: Subject to any disclaimer, the term of this patent is extended or adjusted under 35 U.S.C. 154(b) by 1 day.

(21) Appl. No.: 15/653,301

(22) Filed: Jul. 18, 2017

(65) Prior Publication Data

US 2018/0027427 A1 Jan. 25, 2018

Related U.S. Application Data

(63) Continuation of application No. 15/356,296, filed on Nov. 18, 2016, now Pat. No. 9,848,342.

(Continued)

(51) Int. Cl.
| | |
|---|---|
| H03F 1/32 | (2006.01) |
| H04B 7/0456 | (2017.01) |
| H04B 17/336 | (2015.01) |
| H04B 7/04 | (2017.01) |
| H04W 24/02 | (2009.01) |
| H04W 52/52 | (2009.01) |

(Continued)

(52) U.S. Cl.
CPC ............ H04B 7/0456 (2013.01); H04B 7/04 (2013.01); H04B 17/336 (2015.01); H04W 24/02 (2013.01); H04W 52/52 (2013.01); H05K 999/99 (2013.01); *H04B 7/0413* (2013.01); *H04W 84/12* (2013.01)

(58) Field of Classification Search
CPC ........ H03F 1/3247; H03F 3/24; H03F 1/3241; H04L 27/368; H03G 3/3042
USPC .................................................. 375/295–297
See application file for complete search history.

(56) References Cited

U.S. PATENT DOCUMENTS

| 5,519,530 A | 5/1996 | Utsumi |
| 5,778,308 A | 7/1998 | Sroka et al. |

(Continued)

FOREIGN PATENT DOCUMENTS

EP 0633658 A2 11/1995

OTHER PUBLICATIONS

Abdul Wakeel, "Peak-to-Average Ratio Reduction for MIMO and Multi-user OFDM Systems", Jacobs University, School of Engineering and Science, Dissertation for Doctor of Philosophy in Electrical Engineering, Jacobs University Bremen, pp. 1-135, Dec. 2015.

(Continued)

*Primary Examiner* — James M Perez
(74) *Attorney, Agent, or Firm* — Schmeiser, Olsen & Watts LLP

(57) ABSTRACT

Methods, apparatuses, and systems that receive a communication signal. The communication signal may be split into a first communication signal and a second communication signal. The first communication signal may be zero padded. The zero padded first communication signal may be excursion compensated to generate an excursion compensated signal. The excursion compensating may be performed by fast Fourier transform logic. Zero padding may allow for efficient fast Fourier transform process by ensuring that the length of data frames processed is an integer power of two.

48 Claims, 27 Drawing Sheets

Related U.S. Application Data

Figure 1:
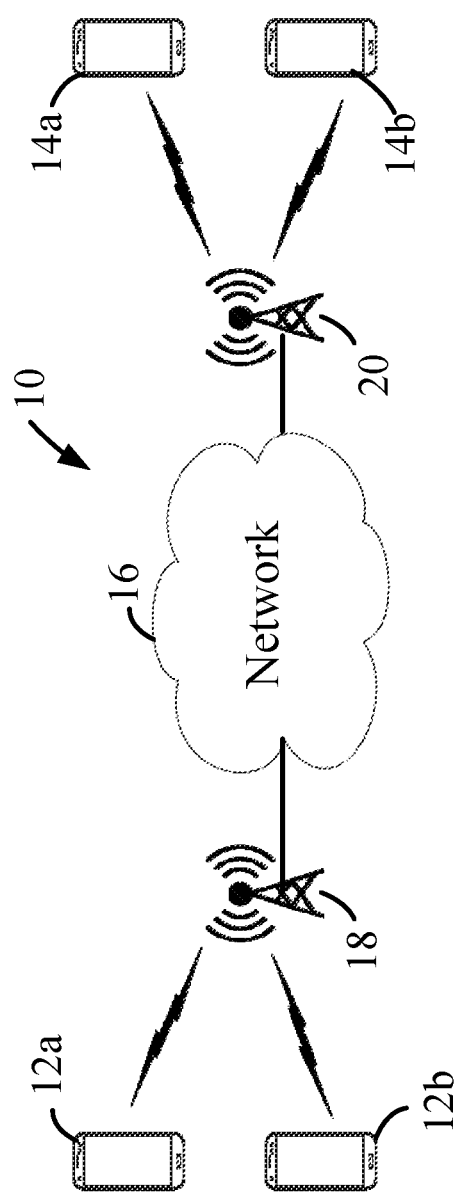

(60) Provisional application No. 62/364,714, filed on Jul. 20, 2016.

(51) Int. Cl.
*H04B 7/0413* (2017.01)
*H04W 84/12* (2009.01)

(56) References Cited

U.S. PATENT DOCUMENTS

| | | | |
|---|---|---|---|
| 6,104,761 A | 8/2000 | McCallister et al. | |
| 6,332,119 B1 | 12/2001 | Hinderks | |
| 6,356,606 B1 | 3/2002 | Hahm | |
| 6,366,619 B1 | 4/2002 | McCallister et al. | |
| 6,519,244 B1 | 2/2003 | Unno | |
| 6,687,511 B2 | 2/2004 | McGowan et al. | |
| 6,741,661 B2 | 5/2004 | Wheatley, III et al. | |
| 6,771,940 B2 | 8/2004 | Smith | |
| 6,845,082 B2 | 1/2005 | Bourget et al. | |
| 6,882,217 B1* | 4/2005 | Mueller | H03F 1/3241 330/2 |
| 6,928,121 B2 | 8/2005 | MacFarlane Shearer, III et al. | |
| 6,950,387 B2* | 9/2005 | Shor | H04L 5/06 370/206 |
| 6,999,522 B2 | 2/2006 | Shearer, III | |
| 7,099,399 B2 | 8/2006 | McCallister | |
| 7,113,033 B2 | 9/2006 | Barnett | |
| 7,218,254 B2 | 5/2007 | Kahlman | |
| 7,251,463 B2* | 7/2007 | McCallister | H04B 1/0475 455/114.2 |
| 7,295,816 B2* | 11/2007 | McCallister | H04B 1/0475 455/114.2 |
| 7,336,716 B2* | 2/2008 | Maltsev | H03F 1/3247 375/260 |
| 7,342,976 B2 | 3/2008 | McCallister | |
| 7,366,090 B2* | 4/2008 | Suh | H04L 27/2613 370/208 |
| 7,376,197 B2 | 5/2008 | Berangi et al. | |
| 7,519,123 B1* | 4/2009 | Larsson | H04B 1/71635 370/209 |
| 7,539,259 B2* | 5/2009 | Dias | H04B 7/04 375/260 |
| 7,570,931 B2 | 8/2009 | McCallister | |
| 7,634,020 B2* | 12/2009 | Batra | H04L 27/2613 375/295 |
| 7,643,801 B2 | 1/2010 | Piirainen | |
| 7,720,175 B2* | 5/2010 | Yeon | H04L 27/2624 375/296 |
| 7,747,224 B2* | 6/2010 | McCallister | H03F 1/0205 375/267 |
| 7,751,786 B2* | 7/2010 | McCallister | H03F 1/0205 324/615 |
| 7,778,347 B2* | 8/2010 | Chen | H04L 27/2623 375/254 |
| 7,783,260 B2* | 8/2010 | McCallister | H03F 1/0205 375/227 |
| 7,792,200 B2 | 9/2010 | Molander | |
| 7,860,194 B2* | 12/2010 | Kim | H04L 1/0052 375/262 |
| 7,869,767 B2* | 1/2011 | McCallister | H03F 1/0205 375/267 |
| 7,944,991 B2 | 5/2011 | Zhao et al. | |
| 7,991,091 B2* | 8/2011 | Suzuki | H04L 27/2605 370/203 |
| 8,000,661 B2* | 8/2011 | Chiu | H03F 1/3247 455/114.3 |
| 8,026,845 B2 | 9/2011 | Wolf | |
| 8,045,635 B2* | 10/2011 | Ko | H04L 27/2602 341/94 |
| 8,064,554 B2* | 11/2011 | Suzuki | H04L 27/2605 370/348 |
| 8,090,050 B2* | 1/2012 | Suzuki | H04L 27/2605 370/210 |
| 8,098,744 B2* | 1/2012 | Chen | H04L 27/2614 375/260 |
| 8,130,862 B2* | 3/2012 | Forenza | H04B 7/022 375/295 |
| 8,185,065 B2* | 5/2012 | McCallister | H03F 1/3247 375/296 |
| 8,238,318 B1* | 8/2012 | Negus | H04W 84/12 370/338 |
| 8,311,023 B1* | 11/2012 | Negus | H04W 84/12 370/338 |
| 8,331,466 B2 | 12/2012 | Guo et al. | |
| 8,350,557 B2* | 1/2013 | Sun | H03F 1/3247 324/123 R |
| 8,401,095 B2* | 3/2013 | Han | H04L 27/2636 375/259 |
| 8,406,113 B2 | 3/2013 | Zhao et al. | |
| 8,446,990 B2* | 5/2013 | Liu | H04L 25/0212 375/259 |
| 8,582,687 B2* | 11/2013 | Terry | H04L 27/2615 375/296 |
| 8,605,814 B2 | 12/2013 | McCallister | |
| 8,787,493 B2* | 7/2014 | Ohlmer | H04B 7/0417 375/296 |
| 8,798,471 B2* | 8/2014 | Gaete | H04L 27/2096 398/182 |
| 8,804,873 B1* | 8/2014 | McCallister | H04L 1/0042 375/297 |
| 8,811,365 B2* | 8/2014 | Negus | H04W 84/12 370/338 |
| 8,824,574 B2* | 9/2014 | McCallister | H04L 27/367 375/260 |
| 8,837,652 B2* | 9/2014 | Stern | H04L 5/0039 375/133 |
| 8,842,757 B2 | 9/2014 | Guo et al. | |
| 8,848,819 B2* | 9/2014 | Murakami | H04B 7/0434 375/267 |
| 8,872,720 B2 | 10/2014 | Bae | |
| 8,873,677 B1* | 10/2014 | Loh | H04B 17/13 375/295 |
| 8,885,764 B2 | 11/2014 | Baldemair et al. | |
| 8,909,175 B1* | 12/2014 | McCallister | H04L 27/368 330/127 |
| 8,913,626 B2* | 12/2014 | Malkin | H04L 5/06 370/317 |
| 8,934,854 B2* | 1/2015 | McCallister | H03F 1/3247 375/297 |
| 8,948,713 B2* | 2/2015 | Kratochwil | H04W 52/0251 455/115.1 |
| 8,958,500 B2* | 2/2015 | Huang | H03G 3/3042 375/297 |
| 8,995,568 B1* | 3/2015 | Wu | H04L 25/49 375/260 |
| 9,001,918 B2* | 4/2015 | Taori | H04L 27/2626 375/137 |
| 9,055,463 B2* | 6/2015 | Negus | H04W 84/12 |
| 9,130,543 B2 | 9/2015 | McKinzie | |
| 9,154,168 B2 | 10/2015 | Cova | |
| 9,184,722 B2 | 11/2015 | Bakalski | |
| 9,282,560 B2* | 3/2016 | Negus | H04W 84/12 |
| 9,331,882 B2 | 5/2016 | Fehri et al. | |
| 9,374,256 B2 | 6/2016 | Lozhkin | |
| 9,408,215 B2* | 8/2016 | Negus | H04W 84/12 |
| 9,503,301 B2 | 11/2016 | Dick | |
| 9,544,171 B2* | 1/2017 | Berardinelli | H04L 25/03343 |
| 9,578,643 B2* | 2/2017 | Negus | H04W 84/12 |
| 9,615,326 B2 | 4/2017 | Kravtsov | |
| 9,641,374 B2* | 5/2017 | Li | H04L 27/2628 |
| 9,713,155 B2* | 7/2017 | Negus | H04W 84/12 |
| 9,806,929 B2 | 10/2017 | Farabegoli et al. | |
| 9,848,342 B1* | 12/2017 | McCallister | H04B 17/336 |
| 9,941,946 B2* | 4/2018 | McCallister | H04B 17/336 |
| 9,942,011 B2* | 4/2018 | Tang | H04L 25/03834 |
| 9,973,362 B2* | 5/2018 | Jia | H04B 7/0452 |
| 10,050,816 B2 | 8/2018 | Rajagopal et al. | |
| 10,069,666 B2* | 9/2018 | Lin | H04L 27/2607 |
| 2003/0053562 A1 | 3/2003 | Busson et al. | |
| 2003/0063682 A1 | 4/2003 | Shearer, III | |

(56) References Cited

U.S. PATENT DOCUMENTS

| | | |
|---|---|---|
| 2003/0063683 A1 | 4/2003 | MacFarlane Shearer, III et al. |
| 2003/0086507 A1 | 5/2003 | Kim et al. |
| 2003/0141927 A1 | 7/2003 | Barnett |
| 2003/0165131 A1* | 9/2003 | Liang .................. H04B 1/7103 370/342 |
| 2003/0169824 A1* | 9/2003 | Chayat .................... H04L 5/023 375/260 |
| 2003/0202460 A1* | 10/2003 | Jung .................. H04L 27/2621 370/208 |
| 2003/0218973 A1* | 11/2003 | Oprea .................. H04B 7/0434 370/210 |
| 2004/0008795 A1 | 1/2004 | Chu et al. |
| 2004/0013084 A1* | 1/2004 | Thomas ............ H04L 25/03006 370/210 |
| 2004/0028148 A1 | 2/2004 | Dowling |
| 2004/0081131 A1* | 4/2004 | Walton ................ H04B 7/0421 370/344 |
| 2004/0100210 A1 | 5/2004 | Hori et al. |
| 2004/0151109 A1* | 8/2004 | Batra .................. H04B 1/7163 370/208 |
| 2004/0190560 A1* | 9/2004 | Maltsev .............. H04L 27/2663 370/503 |
| 2004/0198271 A1 | 10/2004 | Kang |
| 2004/0202103 A1* | 10/2004 | Suh .................... H04L 27/2613 370/208 |
| 2004/0208253 A1* | 10/2004 | Joo .................... H04L 27/2613 375/260 |
| 2004/0218689 A1* | 11/2004 | Akhtman ............ H04L 27/2624 375/296 |
| 2004/0228283 A1* | 11/2004 | Naguib ................ H04L 5/0044 370/252 |
| 2004/0266369 A1* | 12/2004 | McCallister ......... H04B 1/0475 455/115.1 |
| 2005/0059362 A1 | 3/2005 | Kalajo et al. |
| 2005/0163248 A1 | 7/2005 | Berangi et al. |
| 2005/0163252 A1* | 7/2005 | McCallister .......... H03F 1/3247 375/296 |
| 2005/0254596 A1* | 11/2005 | Naguib ................ H04L 1/0618 375/299 |
| 2006/0008028 A1* | 1/2006 | Maltsev ............... H03F 1/3247 375/297 |
| 2006/0078040 A1* | 4/2006 | Sung .................. H04L 27/2613 375/140 |
| 2006/0215778 A1 | 9/2006 | Murthy et al. |
| 2007/0082617 A1* | 4/2007 | McCallister ......... H04B 1/0475 455/63.1 |
| 2007/0253496 A1* | 11/2007 | Giannakis ............ H04L 1/0041 375/260 |
| 2007/0254592 A1* | 11/2007 | McCallister .......... H03F 1/0205 455/67.11 |
| 2008/0013476 A1 | 1/2008 | Vasudevan |
| 2008/0037685 A1* | 2/2008 | Giannakis ............ H04L 1/0618 375/299 |
| 2008/0205540 A1* | 8/2008 | Takeda .................... H04B 7/04 375/267 |
| 2008/0232503 A1 | 9/2008 | Kim |
| 2008/0273618 A1 | 11/2008 | Forenza |
| 2008/0285640 A1* | 11/2008 | McCallister ...... H04L 25/03044 375/233 |
| 2009/0034407 A1* | 2/2009 | Lindh ................. H04L 27/2623 370/210 |
| 2009/0044230 A1 | 2/2009 | Oh et al. |
| 2009/0052577 A1* | 2/2009 | Wang ...................... H04L 1/009 375/299 |
| 2009/0060073 A1* | 3/2009 | Yano .................. H04L 27/2614 375/260 |
| 2009/0175365 A1* | 7/2009 | Jun, II ................ H04L 27/2608 375/260 |
| 2009/0274035 A1* | 11/2009 | Siaud .................... H04L 1/0071 370/208 |
| 2009/0285271 A1* | 11/2009 | Perez De Aranda Alonso ............ H04L 25/03133 375/219 |
| 2010/0039100 A1* | 2/2010 | Sun ...................... H03F 1/3247 324/123 R |
| 2010/0048146 A1* | 2/2010 | McCallister ........... H04B 1/525 455/78 |
| 2010/0054621 A1 | 3/2010 | Qi |
| 2010/0056082 A1* | 3/2010 | Chiu .................... H03F 1/3247 455/114.3 |
| 2010/0061493 A1* | 3/2010 | Takahashi ............... H04L 7/042 375/343 |
| 2010/0097923 A1* | 4/2010 | Zhao .................... H04J 11/0026 370/210 |
| 2011/0019753 A1 | 1/2011 | Ko et al. |
| 2011/0032973 A1* | 2/2011 | To ............................. H04J 11/00 375/141 |
| 2011/0044377 A1* | 2/2011 | Ibi ........................... H04J 11/00 375/133 |
| 2011/0064162 A1* | 3/2011 | McCallister ........ H04L 27/2623 375/296 |
| 2011/0092173 A1* | 4/2011 | McCallister .......... H03F 1/3247 455/108 |
| 2011/0150127 A1* | 6/2011 | Calabro ............ H04L 25/03878 375/295 |
| 2011/0228758 A1* | 9/2011 | Hammarwall ...... H04L 27/2614 370/344 |
| 2011/0280349 A1 | 11/2011 | Hong et al. |
| 2012/0076250 A1* | 3/2012 | Kravtsov .......... H04L 25/03834 375/350 |
| 2012/0307937 A1* | 12/2012 | Higuchi ................. H04J 11/003 375/296 |
| 2012/0327830 A1* | 12/2012 | Hamaguchi ............ H04J 11/003 370/311 |
| 2013/0094345 A1* | 4/2013 | Woodward .......... H04L 27/2628 370/210 |
| 2013/0100897 A1* | 4/2013 | Negus .................... H04W 84/12 370/329 |
| 2013/0141160 A1* | 6/2013 | Ohkawara ............ H03F 1/3247 330/149 |
| 2013/0142101 A1* | 6/2013 | Tanno .................. H04B 1/7075 370/312 |
| 2013/0208609 A1 | 8/2013 | Sripathi |
| 2013/0215935 A1 | 8/2013 | Nuzman |
| 2013/0265973 A1* | 10/2013 | Nakamura ........... H04J 11/0023 370/329 |
| 2013/0279439 A1* | 10/2013 | Takahashi ........... H04L 27/2623 370/329 |
| 2013/0329830 A1* | 12/2013 | Yokomakura ........ H04B 7/0413 375/295 |
| 2014/0064342 A1* | 3/2014 | Jongren ............. H04L 25/03343 375/219 |
| 2014/0065986 A1* | 3/2014 | McCallister .......... H03F 1/3247 455/91 |
| 2014/0112168 A1 | 4/2014 | Chen et al. |
| 2014/0139286 A1* | 5/2014 | Laporte ................. H03F 1/3247 330/149 |
| 2014/0192925 A1* | 7/2014 | Li .......................... H04L 25/08 375/297 |
| 2014/0269987 A1* | 9/2014 | Gubeskys ............ H04L 27/2624 375/296 |
| 2014/0307768 A1 | 10/2014 | Gotman et al. |
| 2014/0313088 A1 | 10/2014 | Rozenblit et al. |
| 2014/0328433 A1* | 11/2014 | Loh ....................... H04L 27/368 375/297 |
| 2014/0362934 A1* | 12/2014 | Kumar ................ H04L 27/2602 375/260 |
| 2015/0016362 A1* | 1/2015 | Negus .................... H04W 84/12 370/329 |
| 2015/0094008 A1 | 4/2015 | Maxim |
| 2015/0120219 A1 | 4/2015 | Merlin et al. |
| 2015/0200797 A1* | 7/2015 | McCallister ........ H04L 27/2623 370/329 |
| 2015/0222468 A1* | 8/2015 | Li ....................... H04L 27/2628 375/295 |

(56) References Cited

U.S. PATENT DOCUMENTS

| | | | | |
|---|---|---|---|---|
| 2015/0223250 | A1* | 8/2015 | Negus | H04W 84/12 |
| | | | | 370/329 |
| 2015/0256373 | A1 | 9/2015 | Huang et al. | |
| 2016/0087829 | A1* | 3/2016 | Jia | H04B 7/0452 |
| | | | | 375/267 |
| 2016/0135192 | A1* | 5/2016 | Negus | H04W 84/12 |
| | | | | 370/329 |
| 2016/0197756 | A1* | 7/2016 | Mestdagh | H04L 27/2614 |
| | | | | 375/295 |
| 2016/0226594 | A1* | 8/2016 | Haas | H04B 10/516 |
| 2016/0316477 | A1* | 10/2016 | Negus | H04W 84/12 |
| 2017/0033809 | A1* | 2/2017 | Liu | H04B 1/04 |
| 2017/0127421 | A1* | 5/2017 | Negus | H04W 84/12 |
| 2017/0288927 | A1* | 10/2017 | Engin | H04L 27/2623 |
| 2017/0302490 | A1* | 10/2017 | Qiu | H04L 27/2623 |
| 2017/0318589 | A1* | 11/2017 | Negus | H01Q 3/24 |
| 2018/0026685 | A1 | 1/2018 | McCallister | |
| 2018/0027427 | A1* | 1/2018 | McCallister | H04B 17/336 |
| | | | | 375/227 |
| 2018/0048387 | A1* | 2/2018 | Zong | H04B 10/112 |
| 2018/0115449 | A1 | 4/2018 | McCallister et al. | |
| 2018/0219713 | A1* | 8/2018 | Jia | H04B 7/0452 |
| 2018/0254826 | A1* | 9/2018 | Jungnickel | H04B 10/1149 |
| 2018/0262926 | A1* | 9/2018 | McCallister | H04B 17/336 |

OTHER PUBLICATIONS

Hyung G. Myung et al., "Peak Power Characteristics of Single Carrier FDMA MIMO Precoding System", Dept. of Electrical and Computer Engineering Polytechnic University, IEEE, 2007, pp. 1-5, Brooklyn, NY.

Raviv Raich et al., "Orthogonal Polynomials for Power Amplifier Modeling and Predistorter Design", IEEE Transactions on Vehicular Technology, vol. 53, No. 5, Sep. 2004, pp. 1468-1480, School of Electrical and Computer Engineering, Georgia Institute of Technology, Atlanta, GA.

Hyung G. Myung, "Introduction to Single Carrier FDMA", 15th European Signal Processing Conference (EUSIPCO 2007), Sep. 3-7, 2007, copyright by EURASIP; Poznan, Poland.

Hyung G. Myung, "Peak-to-Average Power Ration of Single Carver FDMA Signals with Pulse Shaping", 17th Annual IEEE Int. Symposium on Personal, Indoor and Mobile Radio Communications (PIMRC'06), USA, 2006.

Hung Him (George) Yuen et al., "Single Carrier Frequency Division Multiple Access (SC-FDMA) for Filter Bank Multicarrier Communication System" ECE Dept University of Utah, 2010.

McCallister, Rondald Duane, Excursion Compensation in Multipath Communication Systems with a Cyclic Prefix, International Search Report, PCT Serial No. PCT/US2017/42886, dated Dec. 14, 2017.

Ssei Kanno, Yoshiaki Amano, and Akira Yamaguchi, Experimental Evaluation of Adaptive Impedance Control or MIMO Antennas in an FDD-LTE Terminal, 2013, pp. 373-375, KDDI R&D Laboratories Inc., 2-1-15 Ohara, Fujimino City, Saitama, 356-8502 Japan.

Saleh et al., "Improving the Power-Added Efficiency of FET Amplifiers Operating with Varying-Envelope Signals", IEEE Transactions on Microwave Theory and Techniques, Jan. 1993, pp. 51-56, vol. 31, No. 1., NJ USA.

Carusone et al., "Analog Filter Adaptation Using a Dithered Linear Search Algorithm", Int'l Symp. Circuits Systems, ISCAS 2002, vol. 4, 2002, pp. 269-272.

Greenemeier, "People Love Their Smartphones but Hate the Batteries [Survey Results]", Scientific American, Nov. 28, 2014, pp. 1-6.

Hendy et al., "Envelope Tacking for RF Power Amplifiers in Mobile Handsets", Tech Design Forum, Mar. 7, 2012, pp. 1-4, http://www.techdesignforums.com/practice/technique/envelope-tracking-for-rf-power-amplifier.

Altera Corporation, Crest Factor Reduction for OFDMA Systems, Application Note 475, Nov. 2007, pp. 1-29, Version 1.0, Altera Corporation, San Jose, California, USA.

Anthony Chan Carusone and David A. Johns, Analog Filter Adaptation Using a Dithered Linear Search Algorithm, Dept. of Electrical and Computer Engineering, University of Toronto, Toronto Canada.

Darko Sinanovic, Gordan Sisul and Borivoj Modlic, SFBC with clipping and filtering as a transmit diversity technique in SC-FDMA, 2015, pp. 350-358, Automatika, Sarajevo, Bosnia and Herzegovina.

* cited by examiner

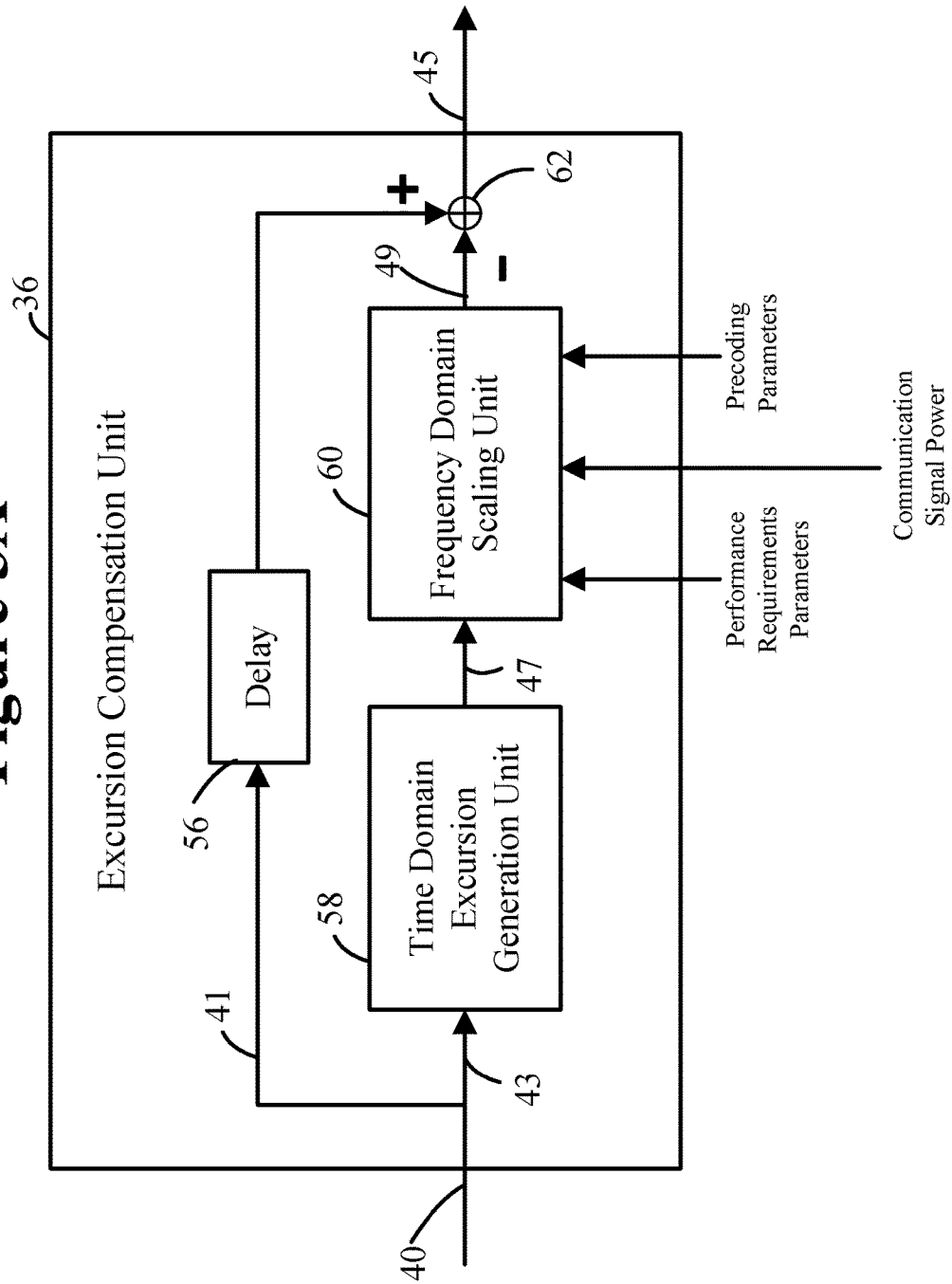

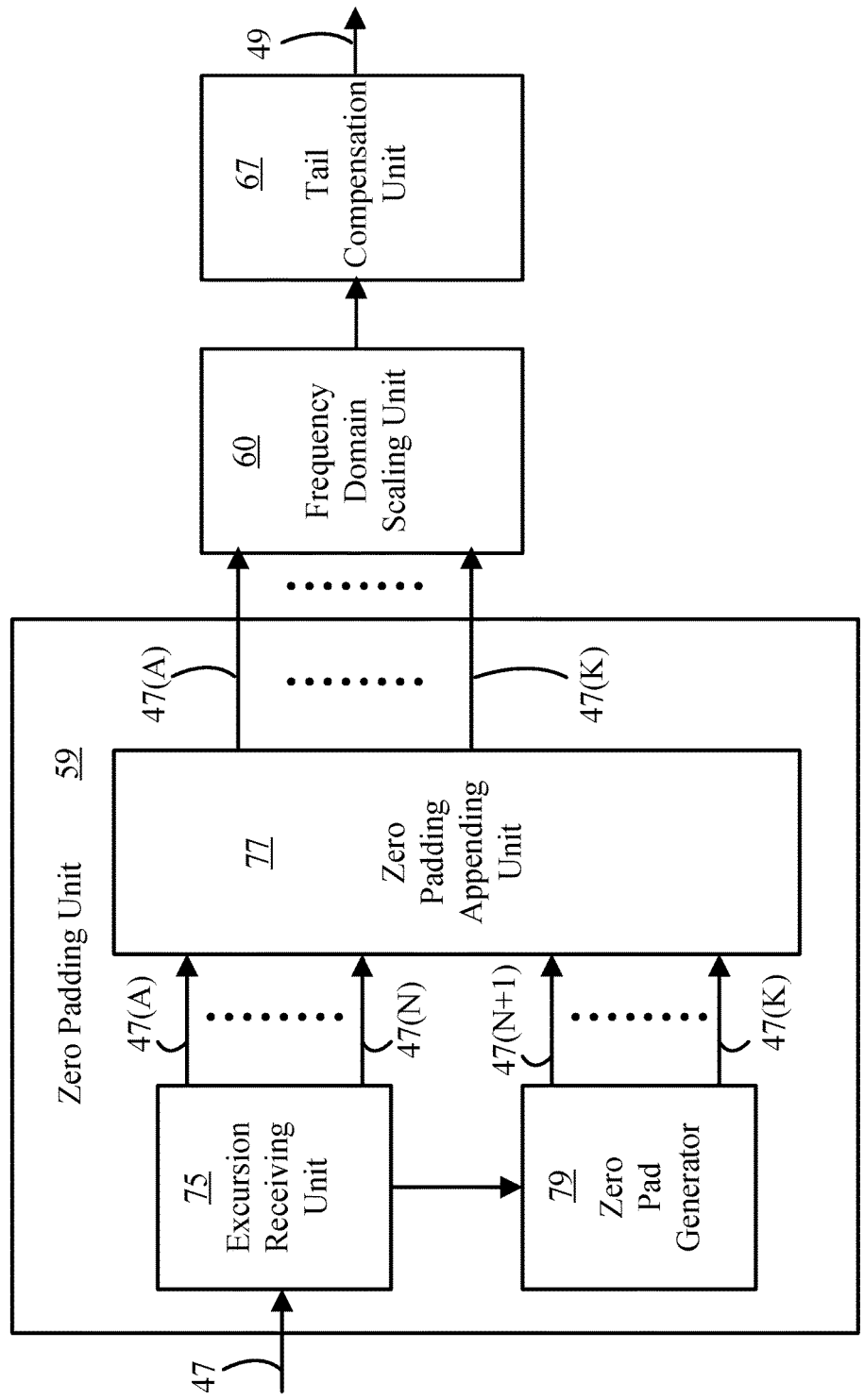

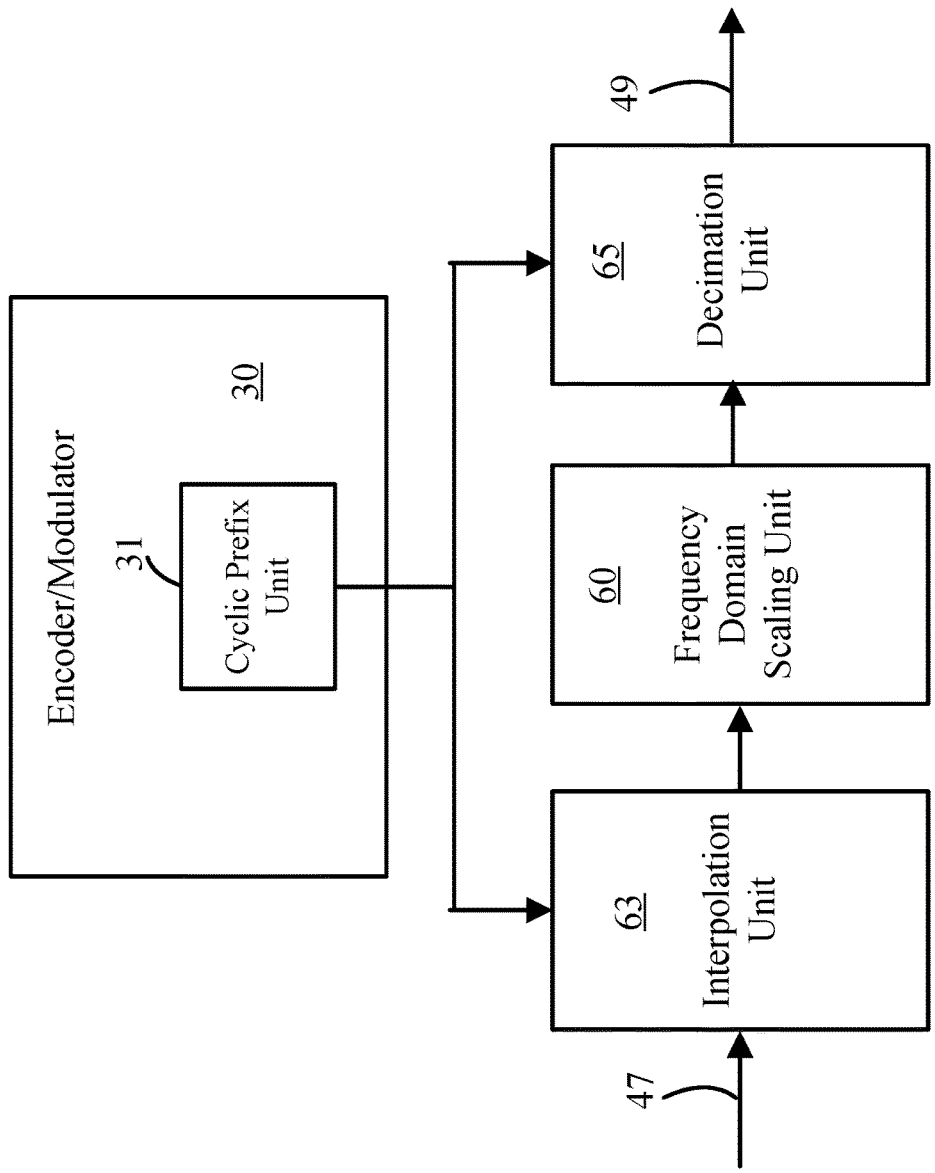

EXCURSION COMPENSATION IN MULTIPATH COMMUNICATION SYSTEMS WITH A CYCLIC PREFIX

This U.S. patent application claims priority to U.S. Provisional Patent Application No. 62/364,714 filed on Jul. 20, 2016 and U.S. patent application Ser. No. 15/356,296 filed Nov. 18, 2016, which are hereby incorporated by reference herein in their entireties.

BACKGROUND

Communication systems such as mobile telephone systems, internet connected computing devices, long distance communication lines, satellite systems, and other systems have had a profound effect on human development. Communication systems have made the world a smaller place by allowing people to communicate over great distances with relative ease. Mobile telephone systems have allowed people to be accessible and have access to data resources around the clock. These systems are relatively complicated and have many complementary components. As communication systems develop, there are increasing demands that the systems are designed to operate more efficiently and perform with increasing effectiveness. For example, mobile phones are expected to be able to transmit more data and have a minimized battery size.

In wireless communication systems, electrical data signals (e.g. voice signals, internet data, etc.) are transmitted from a transmitter to a receiver using antennas. In order for these electrical data signals to be propagated as radio waves with adequate strength, prior to the electrical data signals being propagated by an antenna, the electrical data signals need to be amplified by an amplifier. Amplifiers, particularly for high performing wireless devices, are relatively expensive and sensitive components. Accordingly, when a communication system is designed, cost and operation of an amplifier is carefully considered. For instance, if the amplifiers are too expensive, then a communication system cannot be constructed that is commercially viable. Likewise, if the amplifiers that are affordable for a communication system have inadequacies, then a communication system may not be functionally viable. As another example, if amplifiers implemented in battery operated devices (e.g. mobile telephones) are operated in an inefficient manner, then there may be undesirable battery drain, which could as a result undesirably increase the size and/or weight of the battery operated devices.

In communications systems, a relatively low power communication signal conveying data may be input into an amplifier and the amplifier may output a higher power communication signal. Although the relatively low power communication signal is inadequate to create radio waves through an antenna, the higher power communication signal may be propagated through an antenna so that communication is possible between two wireless devices. However, if the relatively low power communication signal input into the amplifier is too high, the amplifier will not operate properly, causing problems such as distortions or interference. If the relatively low power communication signals are too low, link data capacity is reduced or amplifier power efficiency may be non-optimal. Accordingly, in order to maximize the utility of an amplifier, the low power communication signal input into the amplifier should be as strong as possible relative to the signal magnitude threshold of an amplifier without the relatively low power communication signals exceeding the signal magnitude threshold of the amplifier. The signal magnitude threshold of an amplifier is related to the maximum signal strength that an amplifier can receive without causing distortions or interference.

Portions of the relatively low input communication signal input into an amplifier whose magnitude exceeds the signal magnitude threshold may be referred to as excursions. These excursions can be suppressed, thus allowing an amplifier to operate without distortions or interference or in an optimal power efficient manner. However, when these excursions are suppressed without frequency domain considerations, random noise at unacceptable levels may be introduced into the communication signal, which can unacceptably increase the rate of bit errors over the communication link. Many communication systems (e.g. LTE mobile phone communication systems) have performance requirements parameters, which constrain noise levels below certain levels relative to associated signal power. Accordingly, when excursions are suppressed, then these performance requirements parameters must also be satisfied.

Some communications systems are multipath communication systems where a transmitter has multiple antennas and a receiver has multiple antennas, which transmit and receive the same frequencies. Normally, competing signals transmitted and received using the same frequencies suffer from destructive interference. However, in multiple-in multiple-out (MIMO) communication systems or other multipath communication signals, the parallel signals can be strategically mixed together to manipulate the multipath radio environment. These mixed signals also have the challenge that they should not have excursions which exceed the signal magnitude thresholds of the associated amplifiers. Since these MIMO communication signals are a strategic mix of communication signals which may have different performance requirements parameters, it is a substantial challenge to compensate for these excursions while at the same time satisfying the performance requirements parameters of the communication system.

In some communication systems, cyclic prefixes are used in conjunction with modulation in order to retain sinusoids' properties in multipath channels. Sinusoidal signals are eigenfunctions of linear and time-invariant systems. Therefore, if the channel is assumed to be linear and time-invariant, then a sinusoid of infinite duration would be an eigenfunction. However, in practice, this cannot be achieved, as real signals are always time-limited. So, to mimic the infinite behavior, prefixing the end of the symbol to the beginning makes the linear convolution of the channel appear as though it were circular convolution, and thus, preserve this property in the part of the symbol after the cyclic prefix. However, there are challenges in communication systems that used cyclic prefixes in conjunction with excursion compensation.

SUMMARY

Embodiments relate to a method and/or apparatus that receives a communication signal. The communication signal may be split into a first communication signal and a second communication signal. The first communication signal may be zero padded. The zero padded first communication signal may be excursion compensated to generate an excursion compensated signal. The excursion compensating may be performed by fast Fourier transform logic. Zero padding and/or calculated interpolation may allow for efficient fast Fourier transform process by ensuring that the length of data frames processed is an integer power of two. In embodiments, zero padding and/or interpolation may accommodate for complexities due to the use of cyclic prefixes in communication systems that implement excursion compensation.

DRAWINGS

Example FIG. 1 illustrates a communications network, in accordance with embodiments.

Figure 2A:
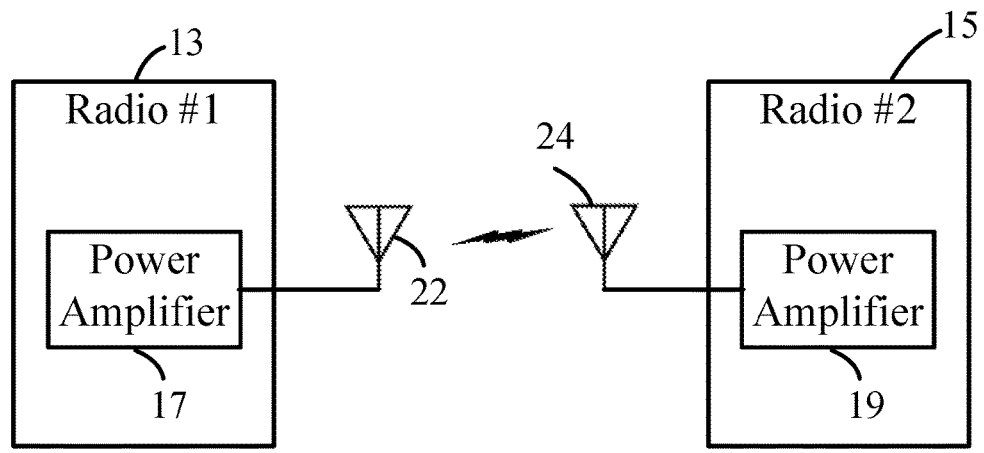
Figure 2B:
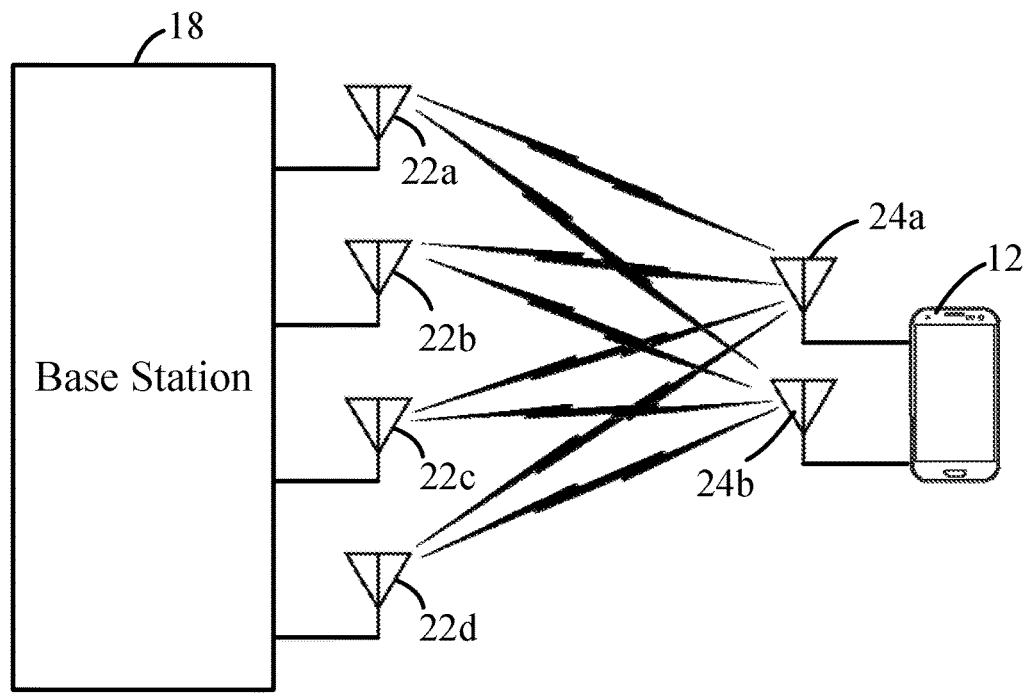

Example FIGS. 2A through 2B illustrate radios in wireless communication, in accordance with embodiments.

Figure 3:
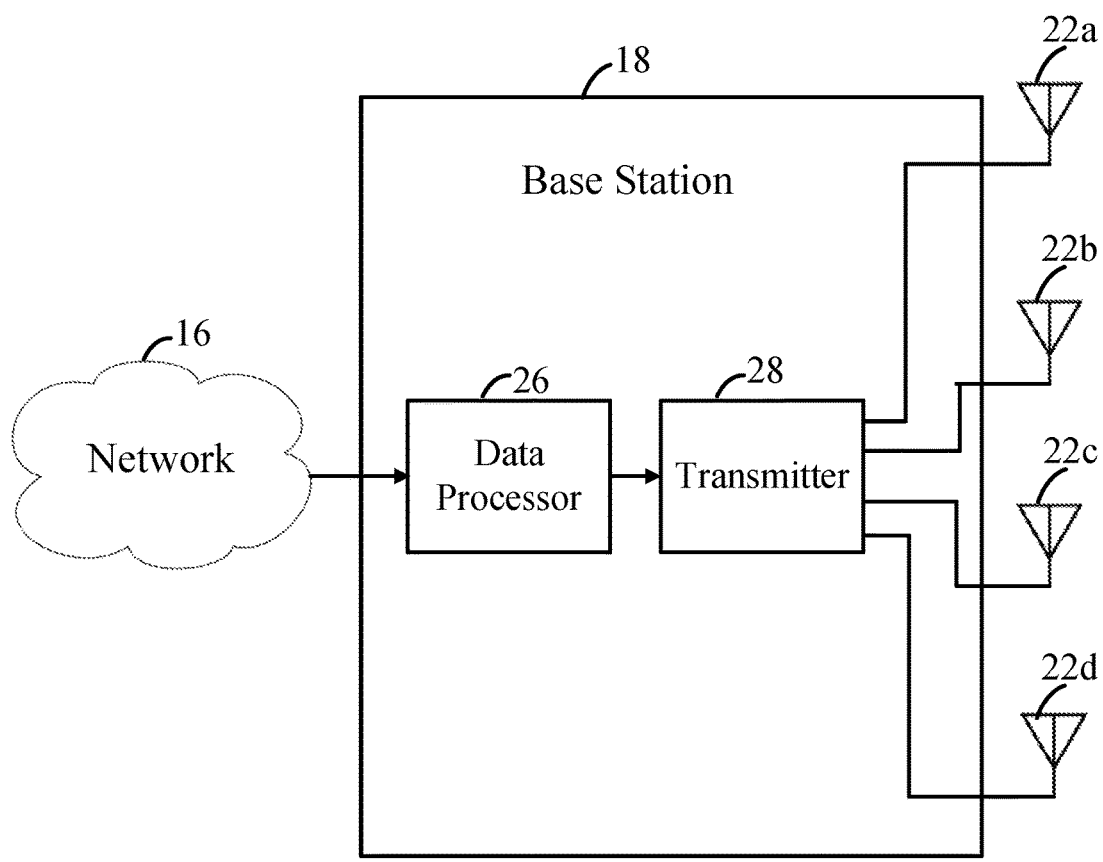

Example FIG. 3 illustrates simplified aspects of a multi-antenna base station, in accordance with embodiments.

Example FIGS. 4A through 4D illustrate transmitters, in accordance with embodiments.

Figure 5B:
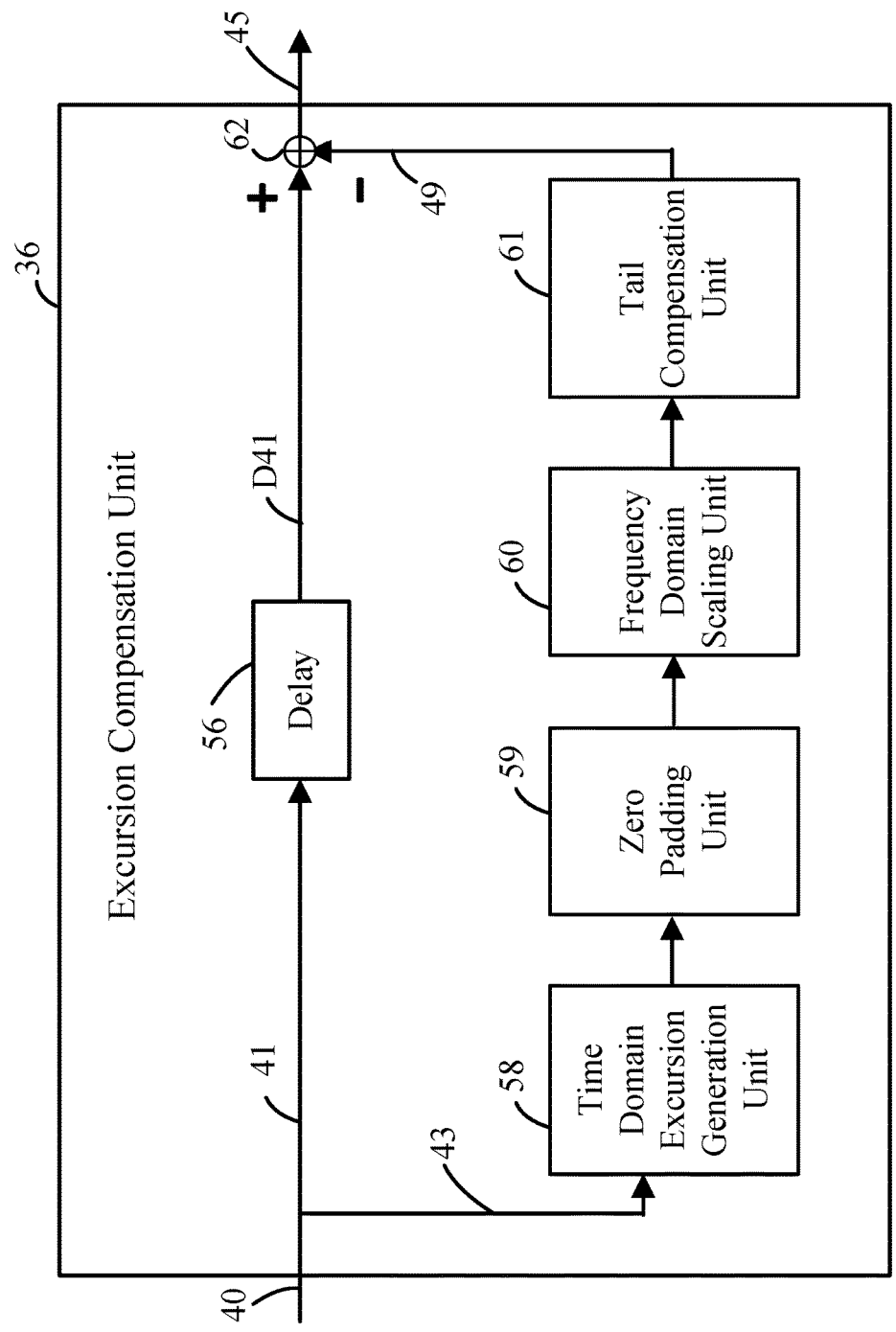
Figure 5C:
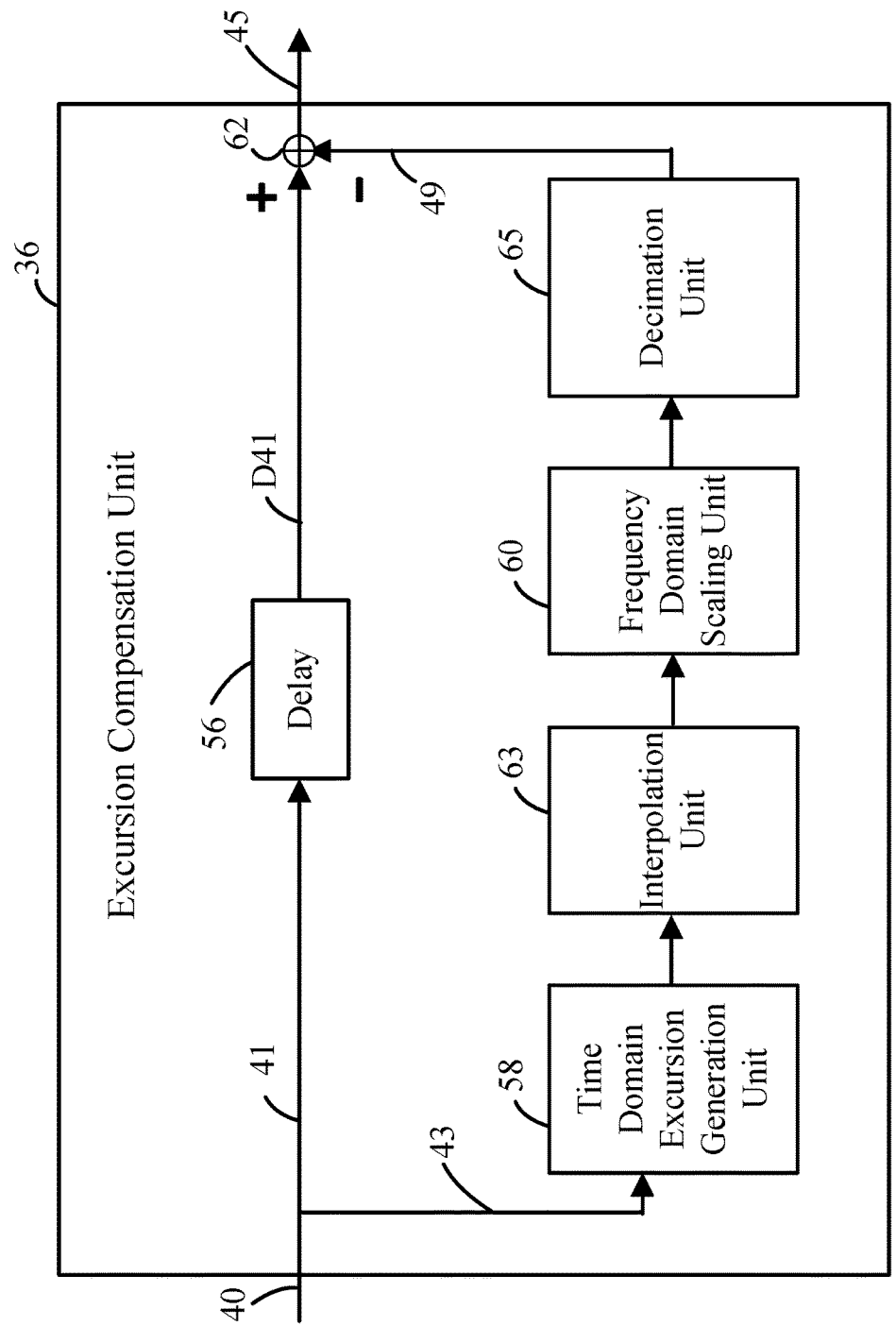

Example FIGS. 5A through 5C illustrates an excursion compensation unit, in accordance with embodiments.

Figure 6A:
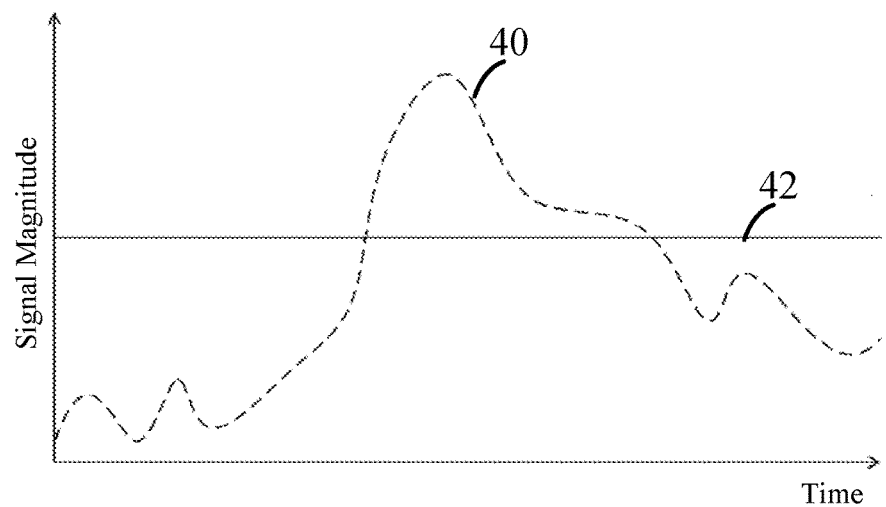
Figure 6B:
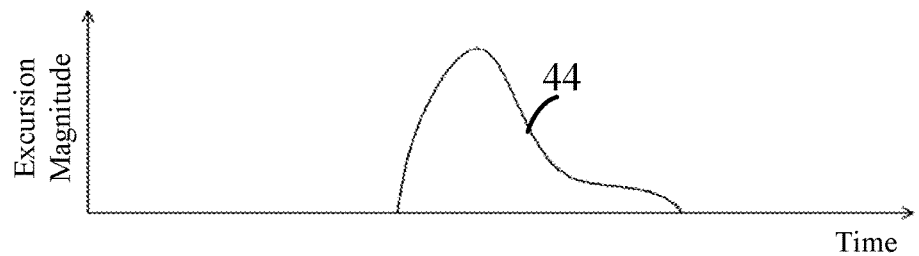
Figure 6C:
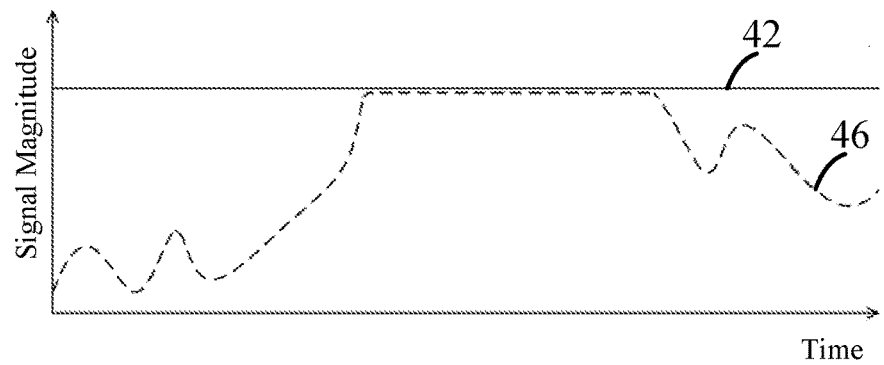

Example FIGS. 6A through 6C illustrate time domain transmission signals that are excursion compensated at a multi-antenna transmitter, in accordance with embodiments.

Figure 7A:
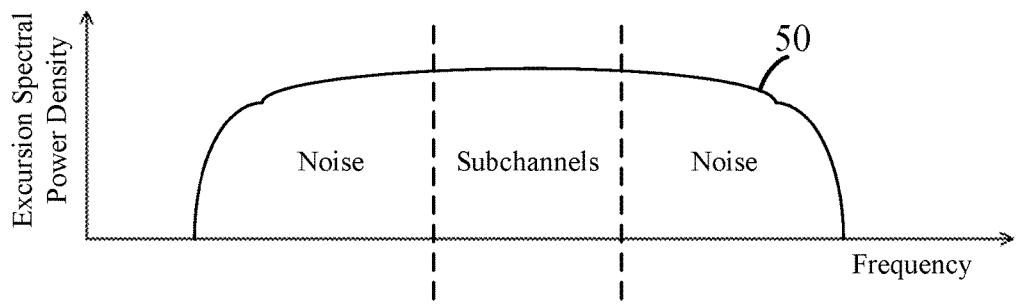
Figure 7B:
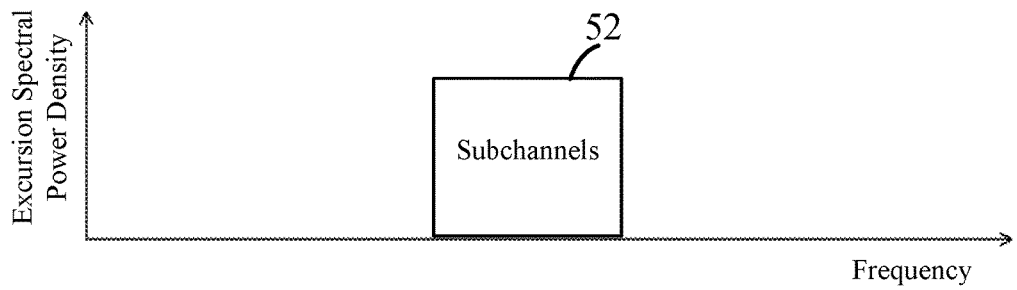
Figure 7C:
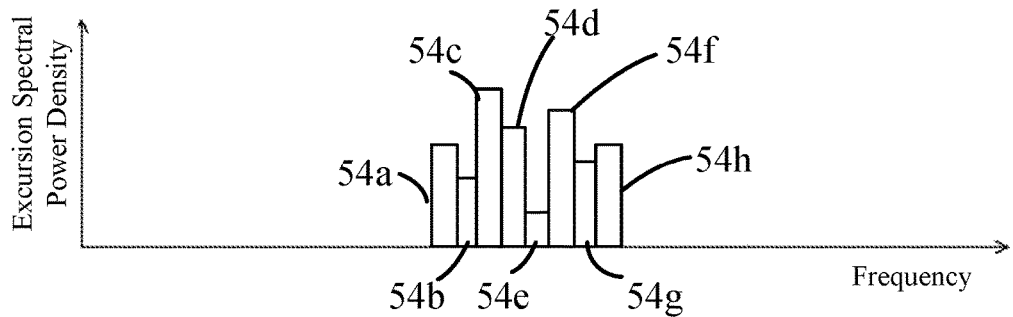

Example FIGS. 7A through 7C illustrate frequency domain signals that are subject to excursion compensation processing at a multi-antenna transmitter, in accordance with embodiments.

Example FIGS. 8A through 8G illustrate a frequency domain scaling unit in relation to a zero padding unit and a tail compensation unit, in accordance with embodiments.

Example FIGS. 9A through 9H illustrate a frequency domain scaling unit in relation to an interpolation unit and a decimation unit, in accordance with embodiments.

DESCRIPTION

Example FIG. 1 illustrates a communications network 10, in accordance with embodiments. Communications network 10 may be a wireless network, although embodiments are not limited to wireless networks. The communications network 10 illustrated in FIG. 1 is merely exemplary for illustrative purposes and is not intended to limit embodiments. Communications network 10 may be a mobile telephone network that services mobile phones 12a, 12b, 14a, and 14b. Mobile phones 12a and 12b may be in wireless communication with base station 18. Likewise, mobile phones 14a and 14b may be in wireless communication with base station 20. Base station 18 and base station 20 may be coupled to network 16, which may be a wired network, optical network, wireless network, or any other communication network as is appreciated by those of ordinary skill in the art. Other communication devices (e.g. computers, landline telephones, servers, data centers, etc.) may be coupled to network 16, as is appreciated by those of ordinary skill in the art.

In embodiments, by wireless communication between mobile phones 12a, 12b, 14a, and 14b with base stations 18 and 20, mobile phones 12a, 12b, 14a, and 14b may have access to network 16 and any resources coupled to network 16. For example, resources coupled to network 16 may include voice communications and/or data communications as is appreciated by those of ordinary skill in the art. Communication between mobile phones 12a, 12b, 14a, and 14b with base stations 18 and 20 may be engineered for communication reliability and/or efficiency.

Example FIGS. 2A through 2B illustrate radios in wireless communication, in accordance with embodiments. In embodiments, power amplifiers are sensitive components which consume a significant amount of electrical power. Preservation, efficiency, and/or management of power amplifier power consumption is imperative when engineering wireless communication systems.

Example FIG. 2A illustrates first radio 13 and second radio 15 in radio communication between respective antennas 22 and 24, in accordance with embodiments. Antenna 22 of first radio 13 is coupled to power amplifier 17. Power amplifier may be a critical component of first radio 13 and a substantial source of power drain during operation of first radio 13. Likewise second radio 15 may have an associated power amplifier 19 for transmission of wireless signals, in accordance with embodiments.

Example FIG. 2B illustrates base station 18 in wireless communication with mobile phone 12, in accordance with embodiments. In embodiments, base station 18 and mobile phone 12 may be wirelessly communicating in a long-term evolution (LTE) communication system implementing multiple-in multiple-out (MIMO) configurations. For example, an LTE communication system implementing MIMO may be configured to have four antennas 22a through 22d at base station 18 and two antennas 24a and 24b at mobile phone 12. One of ordinary skill in the art will appreciate that embodiments may be implemented in other MIMO communication systems or multipath communication systems that utilize any number of antennas at a transmitter (e.g. base station 18) and any number of antennas at a receiver (e.g. mobile phone 12). One of ordinary skill in the art would appreciate that embodiments are not limited to a mobile telephone communication system, base stations, and/or mobile phones. Base station 18 and mobile phone 12 are merely examples of devices that include transmitters and receivers. However, for the simplicity of illustration, the following detailed description uses mobile phones and base stations with arbitrary number of antennas as illustrative examples without limiting the scope of the embodiments to other communication systems.

As illustrated in example FIG. 2B, there are two wireless paths from antenna 22a of the base station 18 to antennas 24a and 24b of mobile phone 12. Likewise, there are multiple paths from each of antennas 22b, 22c, and 22d of base station to antennas 24a and 24b of mobile phone 12. Although these wireless paths are illustrated as direct wireless paths, those skilled in the art appreciate that these paths may be indirect (e.g. reflecting off of items in the surrounding environment such as buildings, geography, vehicles, people, etc.). Further, since all of the wireless paths illustrated between base station 18 and mobile phone 12 are transmitting the same band of frequencies, there is interference between the multiple wireless signals. As those of ordinary skill in the art appreciate, since MIMO communication systems selectively precode the wireless signals that travel by the multiple wireless paths between base station 18 and mobile phone 12, destructive interference between the multiple wireless signals may be minimized and/or otherwise manipulated.

Example FIG. 3 illustrates simplified aspects of base station 18 that are necessary for transmission of communication signals, in accordance with embodiments. Base station 18 may include data processor 26 and transmitter 28. Data processor 26 may receive data from network 16 and organize the received data to provide data streams to transmitter 28. For example, base station 18 may service a plurality of mobile phones in a cell of a wireless communication network. Data processor 26 may receive data to be communicated to the plurality of mobile phone and arrange the data into data streams to be transmitted by transmitter 28. For simplicity of illustration, data processor 26 may perform data layer processing for base station 18 and transmitter 28 may perform physical layer processing for base station 18. However, in embodiments, data processor 26 may also perform physical layer processing or transmitter 28 may also perform data layer processing, as the functions of data processor 26 and transmitter 28 may be intertwined. Transmitter 28 may provide electrical signals to antennas 22a through 22d for MIMO communication. Although example FIG. 3 illustrates aspects of base station 18, these aspects (e.g. data processor 26 and transmitter 28) are also applicable to any other kind of communication device.

Example FIGS. 4A through 4D illustrate transmitters, in accordance with embodiments.

Figure 4A:
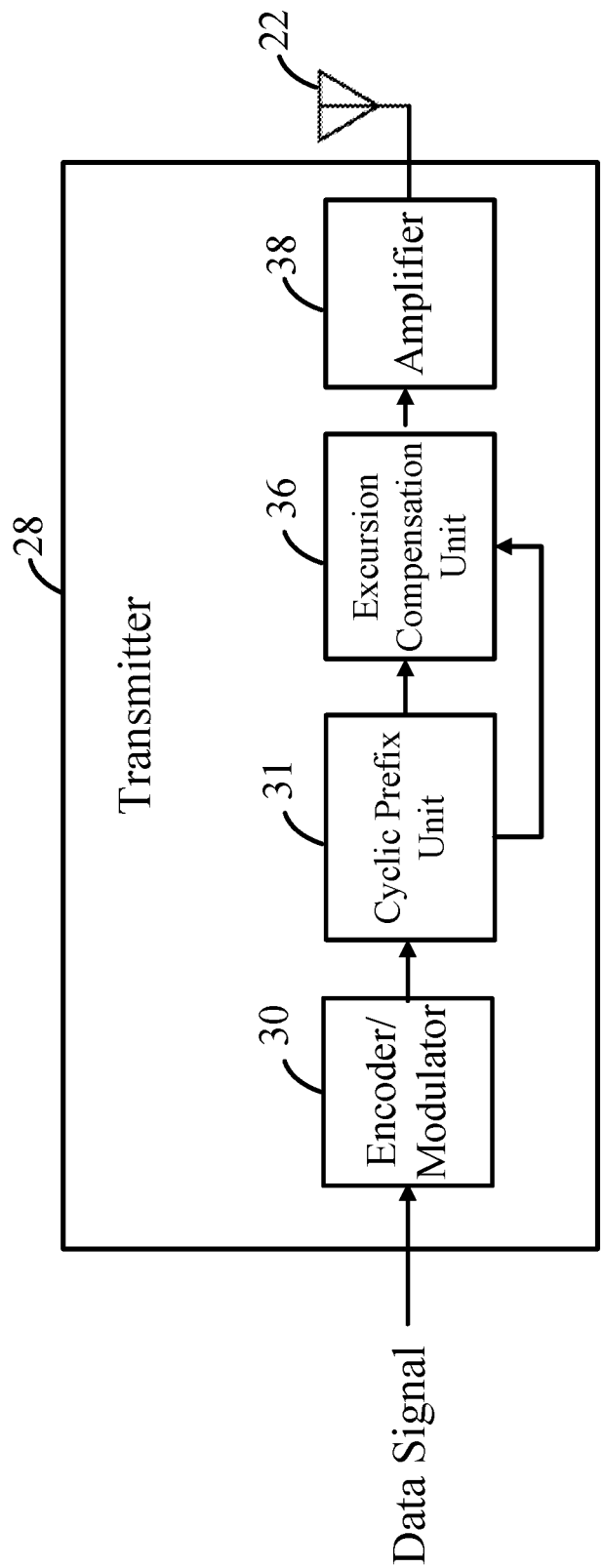

Example FIG. 4A illustrates transmitter 28, in accordance with embodiments. Transmitter 28 may include an encoder and/or modulator unit 30 which encodes and modulates data signals input into transmitter 28. A modulated signal output from encoder/modulator 30 may be extended by adding a cyclic prefix in cyclic prefix unit 31, in accordance with embodiments. A modulated signal with cyclic prefix may be output from cyclic prefix unit 31, in accordance with embodiments. Excursion compensation unit 36 excursion compensates a modulated signal with cyclic prefix prior to amplification and transmission by amplifier 38 and antenna 22, in accordance with embodiments. In embodiments, excursion compensation unit 36 comprises fast Fourier transform algorithms to excursion compensate a modulated signal with cyclic prefix. In embodiments, since fast Fourier transform algorithms are most energy-efficient when transforming vectors having length equal to an integer power of two, excursion compensation unit 36 may zero pad a modulated signal with cyclic prefix in order to implement an efficient algorithm, thus conserving computational and/or power resources. In embodiments, since fast Fourier transform algorithms are most energy-efficient when transforming vectors having length equal to an integer power of two, excursion compensation unit 36 may selectively interpolate a modulated signal with cyclic prefix in order to implement an efficient algorithm, thus conserving computational and/or power resources.

Figure 4B:
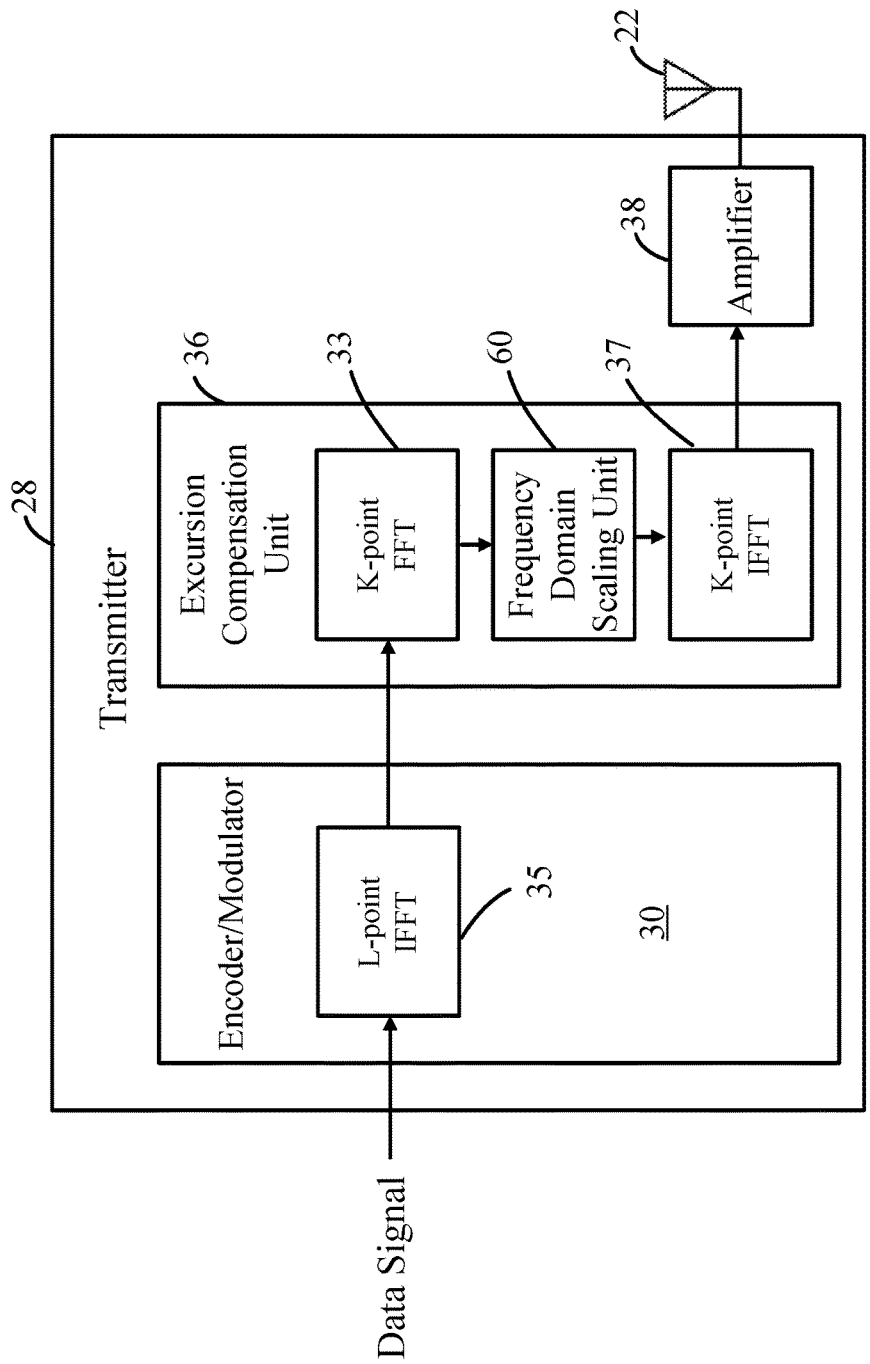
Figure 4C:
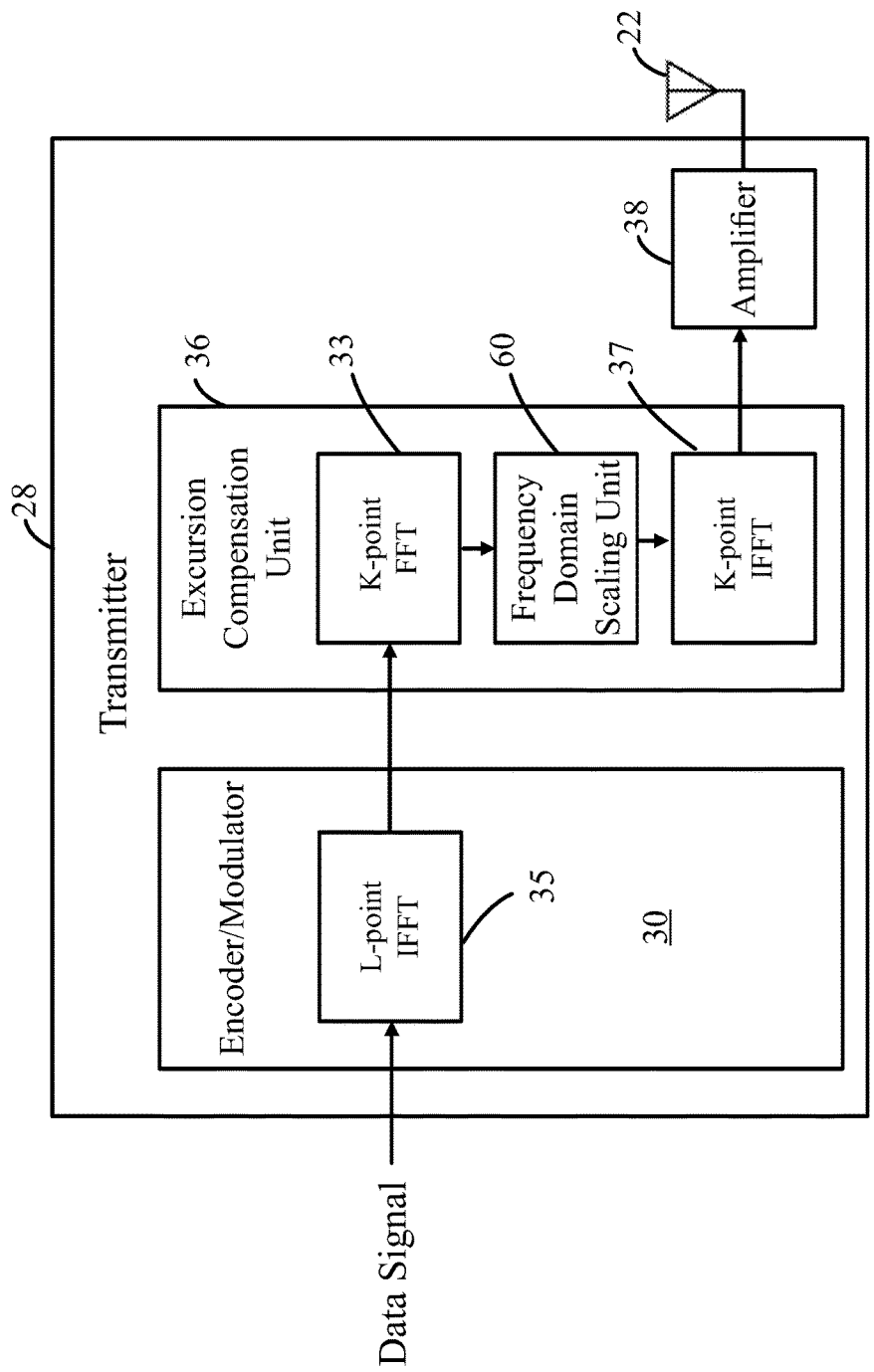

Example FIG. 4B illustrates transmitter 28 with fast Fourier transform (FFT) and inverse fast Fourier transform (IFFT) computation units (e.g. L-point IFFT 35, K-point FFT 33, and K-point IFFT 37), in accordance with embodiments. Cyclic prefix unit 31 is optional and excluded for efficiency. Encoder/modulator 30 may include L-point IFFT computation unit 35 based frame lengths of a communication signal (e.g. OFDMA and/or SC-FDMA communication signals). In embodiments, K-point FFT 33 of excursion compensation unit 36 may be twice the length of L-point IFFT to accommodate for a cyclic prefix length added to the signal after being encoded and/or modulated by encoder modulator 30. Likewise, K-point IFFT 37 of FIG. 4B may optionally be a 2L-point IFFT 37 in FIG. 4C, in accordance with embodiments. Accordingly, example FIG. 4C illustrates a FFT computation at 2L-point FFT 33 and 2L-point IFFT 37 that are twice the length of L-point IFFT 35, in accordance with embodiments.

Figure 4D:
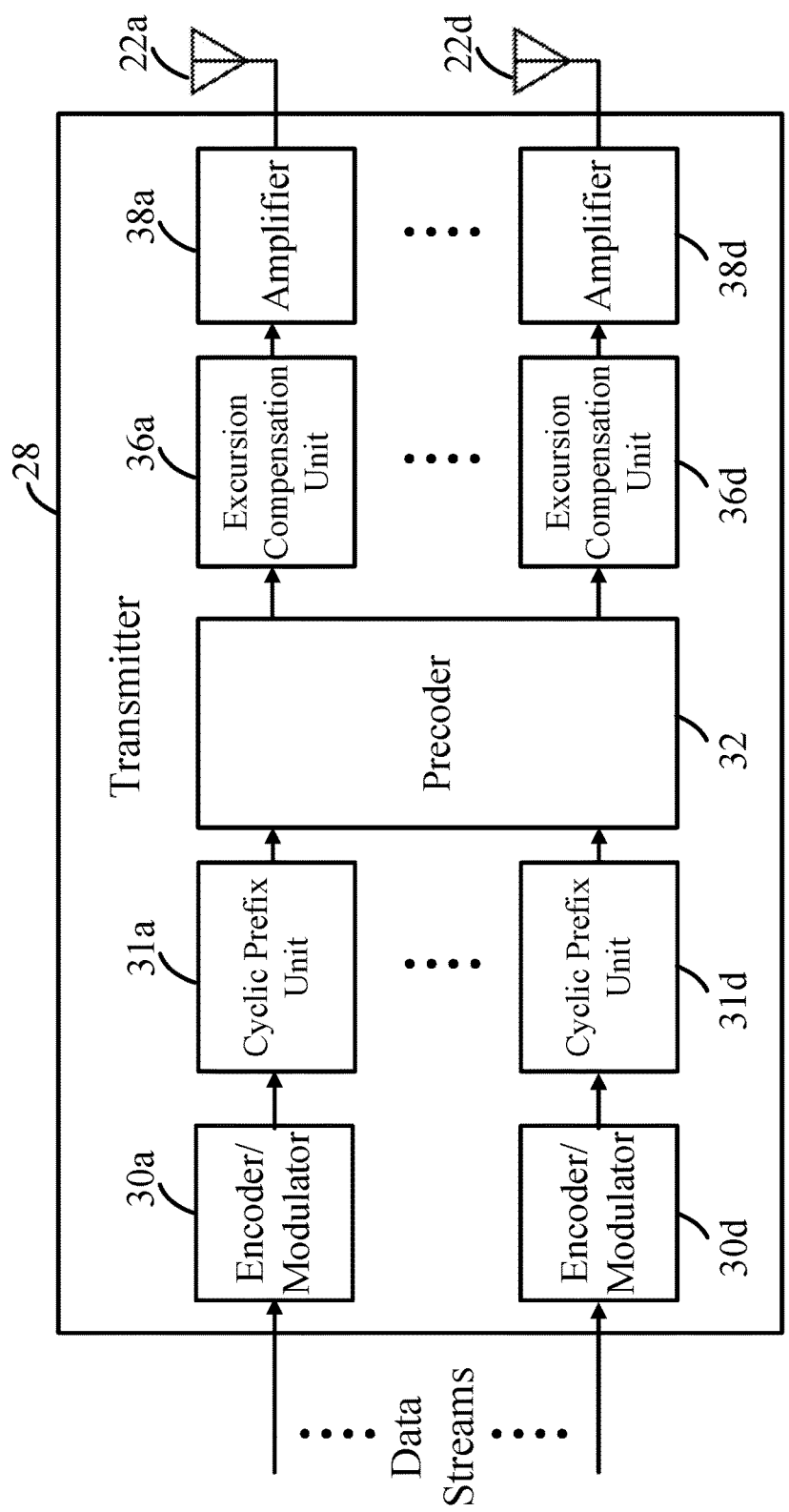

Example FIG. 4D illustrates transmitter 28, which may be implemented in any multi-antenna wireless device, in accordance with embodiments. Data streams may be received by transmitter 28 in a variety of forms. For example, data streams input into transmitter 28 may be the output of a demultiplexer that divides a single higher bit rate data stream into a plurality of lower bit rate data streams. In embodiments, the demultiplexing of data streams may be performed inside transmitter 28 or outside of transmitter 28 without departing from embodiments. For illustrative purposes, transmitter 28 is shown receiving multiple data streams, although in configurations the multiple data streams could be generated inside transmitter 28 without departing from the scope of embodiments. As examples, data streams input into transmitter 28 may be a plurality of different data streams from different sources and/or be a product of a demultiplexed higher bit rate data stream into a plurality of lower bit rate data streams, as appreciated by those of ordinary skill in the art. The number of data streams input into transmitter 28 may equal the number of antennas 22a through 22d used by transmitter 28.

In embodiments, each of the data streams input into transmitter 28 may be encoded and/or modulated by encoders/modulators 30a through 30d. Embodiments are not limited to any specific number of encoders or modulators, although the number of encoders or modulators may match the number of antennas 22a through 22d used by transmitter 28. For illustrative purposes, FIG. 4D illustrates four sets of encoder/modulators 30a through 30d associated with four antennas 22a through 22d of transmitter 28 (e.g. a four antenna MIMO base station).

In embodiments, encoders/modulators 30a through 30d may each include an encoder. An encoder may be a device, circuit, transducer, software program, algorithm, and/or combination thereof that convert information from one format or code to another for the purposes of standardization, speed, bit-error mitigation and/or compression. For the purposes of illustration, encoders of encoders/modulators 30a through 30d are illustrated as part of transmitter 28. Encoder functionality may be included in data processor 26, as appreciated by one of ordinary skill in the art. One of ordinary skill in the art would appreciate that encoding of data may be implemented in a variety of ways prior to the encoded data being modulated and may be implemented through a plurality of processes. In embodiments, some of the encoding of data may be implemented in an encoder and some of the encoding of data may be implemented in a modulator. One of ordinary skill in the art would appreciate that encoding may be performed separate or in conjunction with modulation without departing from the scope of embodiments.

In embodiments, encoders/modulators 30a through 30d may each include a modulator. A modulator may vary one or more properties of a signal with information from input information signals. Information signals input into encoders/modulators 30a through 30d may encode and modulate the data streams into a plurality of subchannels that are frequency division multiplexed. For example, in LTE wireless communication systems, downlink subchannels (e.g. communication signals from base station 18 to mobile phone 12) may be modulated using orthogonal frequency division multiple access (OFDMA), while uplink subchannels (e.g. communication signals from mobile phone 12 to base state 28) may be modulated using single carrier frequency division multiple access (SC-FDMA). However, OFDMA and SC-FDMA are just two examples of a frequency division multiplexed modulation methods that modulate information signals into a plurality of frequency distinguishable subchannels. Embodiments relate to any communication system that implements subchannels during modulation. Embodiments may be implemented in Wi-Fi wireless communication systems, WiMAX wireless communication systems, HSPA+ wireless communication systems, or any other wireless communication system, wired communication system, or optical communication system that manipulates multipath propagation of communication signals.

Encoders/modulators 30*a* through 30*d* may output a plurality of communication signals to cyclic prefix units 31*a* through 31*d*, in accordance with embodiments. Cyclic prefix units 31*a* through 31*d* may add cyclic prefixes to communication signals output from encoder/modulators 30*a* through 30*d*. In embodiments, encoder/modulators 30*a* through 30*d* may have different parameters based on modulation and/or encoding applied.

Cyclic prefix units 31*a* through 31*d* may output a plurality of communication signals to precoder 32, where each of these communication signals includes a plurality of frequency distinguishable sub channels. Although encoders/modulators 30*a* through 30*d* may be functionally and/or effectively separate from each other, precoder 32 implements precoding algorithms to each of the signals input into precoder 32 from encoders/modulators 30*a* through 30*d* that effectively mixes these signals in a manner that is responsive to propagation channel multi-path characteristics. In each of encoders/modulators 30*a* through 30*d*, the plurality of communication signals may each be modulated into a plurality of frequency domain subchannels, with each subchannel having its own frequency spectrum. For example, in LTE communication systems, downlink communication signals may be modulated using orthogonal frequency division multiple access (OFMDA) with a plurality of parallel subchannels distinguishable by their frequency. Likewise, in LTE communication systems, uplink communication signals may be modulated using single carrier frequency division multiple access (SC-FDMA) also with a plurality of parallel subchannels distinguishable by their frequency.

Each of the individual frequency domain subchannels comprising each of the time domain communication signals input into precoder 32 may have its own performance requirements parameters. As appreciated by those skilled in the art, performance requirement parameters may vary from one communication symbol (e.g. a frequency division multiplexed symbol) to the next, reflecting different combinations of modulation and coding in each subchannel. For example, in LTE wireless communication systems, error vector magnitude (EVM) specifications may dictate performance of a digital radio transmitter or receiver. Noise, distortion, spurious signals, and/or phase noise all degrade performance of a digital radio transmitter or receiver. The EVM specification constrains the short-term average ratio of the composite noise to signal power, as measured in the corresponding subchannel at the receiver, to be less than or equal to the EVM specified value. System operators and equipment manufacturers set performance requirements parameters (e.g. EVM specifications in LTE communication systems) in order to qualify equipment (e.g. base stations and mobile phones) which may be used on a network. Specifically, EVM specifications provide a comprehensive measure of the quality of the radio transmitter for use in digital communications. Since wireless networks should be designed to operate in predictable and dependable ways, quality standards (e.g. performance requirements parameters) should be implemented for network quality control purposes. Wireless service providers and wireless equipment manufacturers should only use equipment that satisfies performance requirements parameters, since these performance requirements parameters are central to the overall communication network design and/or dependability of a network to customers.

Particular to MIMO communication systems or other multipath communication systems, each of the encoders/modulators 30*a* through 30*d* may have the same set of frequency distinguishable subchannels that will ultimately be transmitted at the same time from antennas 22*a* through 22*d*. For example, a subchannel modulated at frequency $f_n$ in each of encoders/modulators 30*a* through 30*d* may be transmitted through antennas 22*a* through 22*d* at the same time. In order to avoid destructive interference at frequency $f_n$, precoder 32 selectively mixes each of the subchannels modulated at frequency $f_n$ such that each of the signals transmitted from antennas 22 through 22*d* at frequency $f_n$ do not cumulatively destructively interfere with each other in their receiver outputs. Without precoding performed in precoder 32, the parallel subchannels modulated at $f_n$ by encoders/modulators 30*a* through 30*d* would destructively interfere with each other and a wireless communication link could not be practically established. However, through the precoding performed by precoder 32, the multipath characteristics may be manipulated such that destructive interference is not only avoided, but the multipath characteristics of the wireless environment are exploited to increase the amount of data that can be wirelessly communicated between a transmitter (e.g. base station 18) and receiver (e.g. mobile phone 12) that both have multiple antennas.

However, each of the subchannels at frequency $f_n$ output from encoders/modulators 30*a* through 30*d* and input into precoder 32 may have different performance requirements parameters. For instance, a specific subchannel of the encoded/modulated signal output from encoder/modulator 30*a* may have been subjected to QPSK modulation, while the corresponding subchannel of the encoded/modulated signal output from encoder/modulator 30*b* may have been subjected to 16-QAM modulation, which may each have different performance requirements parameters (e.g. EVM specifications) in an LTE communication system. Accordingly, each communication signal output from precoder 32 into excursion compensation units 36*a* through 36*d* may have a mix of performance requirements parameters in each signal. In embodiments, excursion compensation units 36*a* through 36*d* may be configured to maximize the efficiency of amplifiers 38*a* through 38*d*.

In a MIMO communication system, precoder 32 may selectively modify or precode the plurality of communication signals to generate a plurality of parallel precoded communication signals. Each of these parallel precoded communication signals will be a selective mix of all of the communication signals output from encoders/modulators 30*a* through 30*d*. The selective precoding of the plurality of communication signals exploit multipath propagation from a plurality of antennas of a transmitter (e.g. antennas 22*a* through 22*d*) to a plurality of antennas at a receiver (e.g. antennas 24*a* and 24*b* of mobile phone 12 illustrated in FIG. 2A). Ordinarily, transmitting a plurality of data signals simultaneously on overlapping radio frequency spectrums would cause destructive interference between the subchannels that degrade wireless communication performance. However, in MIMO or other multipath communication systems, by selectively precoding the communication signals at precoder 32, beamforming and/or diversity characteristics may be manipulated to increase the overall wireless communication capacity and/or efficiency. For this reason, LTE communication systems require MIMO communication between base stations 18 and 20 and mobile phones 12*a*, 12*b*, 14*a*, and 14*b*, which relates to non-limiting example embodiments.

Example FIGS. 5A through 5C illustrates an excursion compensation unit, in accordance with embodiments.

Example FIG. 5A illustrates an excursion compensation unit 36, in accordance with embodiments. As an illustrative example, the time domain precoded communication signal input into excursion compensation unit 36 may have a time domain waveform 40 (whose magnitude is illustrated in example FIG. 6A) with a portion of its magnitude greater than the signal magnitude threshold 42 of one of the associated amplifiers 38a through 38d. The time domain precoded communication signal 40 is initially split in excursion compensation unit 36 into a first precoded communication signal 41 and a second precoded communication signal 43.

The first precoded communication signal 41 is delayed by delay element 56, while the second precoded communication 43 signal is processed by time domain excursion generation unit 58 and frequency domain scaling unit 60. Following necessary filtering and scaling operations on the second precoded communication signal 43, an excursion signal derived from the second precoded communication signal 43 may ultimately be subtracted from the first precoded communication signal 41 to generate an excursion compensated precoded communication signal 45 (whose magnitude is illustrated as example waveform 46 in FIG. 6C) which is output from the excursion compensation unit 36. Delay element 56 may be implemented by any process and/or device appreciated by those skilled in the art. The purpose of delay element 56 is to allow time for the second precoded communication 43 signal to be processed by time domain excursion generation unit 58 and frequency domain scaling unit 60. Since a generated excursion signal may be subtracted from the first precoded communication signal 41 in synchronization to generate excursion compensated communication signal 45, delay element 56 allows for this synchronization. Since the required processing is accomplished in a fixed amount of time by the time domain excursion generating unit 58 and frequency domain scaling unit 60, only a constant amount of delay is required to maintain time alignment between the two inputs to subtraction operation 62.

The second precoded communication signal 43 (whose magnitude is illustrated as example waveform 40 in FIG. 6A) is input into time domain excursion generation unit 58. Time domain excursion generation unit 58 extracts in the time domain the portion of the second precoded communication signal 43 whose magnitude is above the signal magnitude threshold of the associated with amplifiers 38 to generate time domain excursion signal (whose magnitude is illustrated as example waveform 44 in FIG. 6B). This time domain excursion signal may ultimately be subtracted from the first precoded communication signal 40 after filtering (to comply with regulatory constraints on power outside the signal bandwidth) and frequency domain channel scaling in frequency domain scaling unit 60 to generate excursion compensated precoded communication signal 45 whose magnitude lies below the signal magnitude threshold 42 of the associated amplifier (illustrated as example waveform 46 in FIG. 6C). In embodiments, a time-domain scaling operation is performed prior to a frequency domain scaling operation.

Extracted excursion signal (whose magnitude is illustrated as example waveform 44 in FIG. 6B) output from time domain excursion generation unit 58 is input into frequency domain scaling unit 60. In frequency domain scaling unit 60, an extracted excursion signal (whose magnitude is illustrated as example waveform 44 in FIG. 6B) is converted to the frequency domain excursion signal (illustrated as example frequency spectrum 50 in example FIG. 7A). The frequency domain excursion signal (e.g. frequency spectrum 50) is scaled in the frequency domain to generate scaled frequency domain signals (illustrated as example subchannels 54a through 54h in FIG. 7C). The scaling of the scaled frequency domain excursion signals (illustrated as example subchannels 54a through 54h in FIG. 7C) are scaled according to performance requirements parameters of the communication signal. The scaled frequency domain signals (illustrated as example subchannels 54a through 54h in FIG. 7C) are then converted back into the time domain to generate a time domain signal whose magnitude exhibits a substantially similar shape as the magnitude of the extracted excursion signal (as illustrated by example waveform 44 in example FIG. 6B). Although there may be distorted differences between extracted excursion signal (whose magnitude is illustrated by example waveform 44 in example FIG. 6B) before and after the time domain excursion extraction and the frequency domain channel scaling, extracted excursion signals may have substantially the same complex shape before and after frequency domain channel scaling, since it is to be subtracted in the time domain from the first precoded communication signal 41 by subtraction operation 62 such that the scaled precoded communication signal 45 is less than the signal magnitude threshold 42 of the associated amplifier.

Example FIG. 5B illustrates excursion compensation unit 36, in accordance with embodiments. A zero padding unit 59 modifies the signal output from time domain excursion generation unit 58 which allow for efficient computational processing in frequency domain scaling unit 60. For example, zero padding unit 59 may add zero and/or nominal entries in a frame length, such that the FFT and IFFT processing in frequency domain scaling unit 60 is computationally efficient, in accordance with embodiments. In embodiments, zero padding unit 59 may zero pad a select number of entries such that the FFT and IFFT computations in frequency domain scaling unit 60 perform computations on frames that have a length that is an integer power of two. After a zero padded signal is processed in frequency domain scaling unit 60, tail compensation unit 61 may compensate for the zero padding unit 59 by discarding entries that were zero padded, so that signal 49 and signal D41 are synchronized and have the same frame length, in accordance with embodiments.

Example FIG. 5C illustrates excursion compensation unit 36, in accordance with embodiments. In embodiments, an interpolation unit 63 may process the signal output from time domain excursion generation unit 58 such that the frame length output from interpolation unit 63 allows for efficient computational processing in frequency domain scaling unit. In embodiments, interpolation unit 63 may interpolate the signal such that the frames output from interpolation unit 63 have a length that is an integer power of two. After an interpolated signal is processed in frequency domain scaling unit 60, decimation unit 65 may decimate the signal such that the signal 49 has the same number of frame entries as signal D41.

In embodiments illustrated in FIGS. 5B and 5C, zero padding unit 59 and/or interpolation unit 63 may be necessitated because cyclic prefix unit(s) 31 increase the frame length of a signal from that output from encoder/modulator(s) 30 to have a length that is not an integer power of two. In embodiments, in order for frequency domain scaling unit 60 to be efficiently implemented, it should include FFT or IFFT algorithms which process frame lengths that have a length equal to an integer power of two. Since cyclic prefix unit(s) 31 often do not increase the length of a frame output from encoder/modulator(s) 30 by more than the length of one frame, embodiments implement FFT and IFFT algorithms with frame lengths twice as long as FFT and/or IFFT algorithms used in encoder/modulator(s) 30.

Example FIGS. 6A through 6C illustrate time domain transmission signals that are excursion compensated at a multi-antenna transmitter, in accordance with embodiments.

Example FIG. 6A illustrates the magnitude over time of an example precoded communication signal 40 output from precoder 32 and input into one of excursion compensation units 36a, 36b, 36c, or 36d. This example precoded communication signal 40, shown in the time domain, corresponds to a plurality of frequency domain subchannels which were modulated by encoder/modulator 30a, 30b, 30c, or 30d and mixed together in precoder 32. A signal magnitude threshold 42 of corresponding amplifier 38a, 38b, 38c, or 38d indicates the maximum signal magnitude that the amplifier 38a, 38b, 38c, or 38d can handle without exhibiting frequency domain aberrations and/or operating inefficiently. The portion of this precoded communication signal 40 whose magnitude exceeds the signal magnitude threshold of the corresponding amplifier 38a, 38b, 38c, or 38d is an excursion portion of the precoded communication signal 40. Excursion compensation units 36a through 36d are configured to modify the precoded communication signals output from precoder 32 such that the excursion compensated precoded communication signals have a signal magnitude below the signal magnitude threshold level 42 of the corresponding amplifiers 38a through 38d. For example, a precoded communication signal 40 output from precoder 32 (whose magnitude is illustrated in FIG. 6A) may be excursion compensated in excursion compensation unit 36a to output excursion compensated precoded communication signal 46 (whose magnitude is illustrated in FIG. 6C). As illustrated in example FIG. 6C, since the magnitude of the excursion compensated precoded communication signal 46 is below the signal magnitude threshold 42 of the corresponding amplifier, the corresponding amplifier will be able to operate properly and/or operate without costly backoff.

However, when a precoded communication signal output from precoder 32 is excursion compensated by one of excursion compensation units 36a through 36d, noise is inevitably introduced to the subchannels in the frequency domain. This introduced noise cannot exceed the performance requirements parameters of the communication system (e.g. EVM specifications of an LTE communication system, regulatory spectral masks constraining out-of-band transmission energy, etc.). Accordingly, it is not a simple matter of clipping the precoded communication signal 40 (whose magnitude is illustrated in FIG. 6A) in the time domain to produce the excursion compensated precoded signal 46 (whose magnitude is illustrated in FIG. 6C). Since the excursion compensated precoded communication signals are amplified by amplifier 38a through 38d and then propagated by antennas 22a through 22d into a multipath radio environment where there is interference between the subchannel frequencies, the excursion compensation must accommodate for the multipath interference such that the communication signals reconstructed at the receiver after post processing do not have noise that exceeds the performance requirements of the communication system. That is, the composite noise due to excursion compensation at the input to any receiver demodulator/decoder includes a mixture of excursion noise contributions from the plurality of transmitter excursions. In embodiments, the excursion compensation units 36a through 36d must compensate for excursions in the time domain such that the signal magnitude is not greater than the signal magnitude threshold of the associated amplifiers 38a through 38d and also compensate in the frequency domain such that the subchannels satisfy the performance requirements parameters notwithstanding the multipath interference of subchannels propagated at the same frequency from the different antennas 22a through 22d.

Excursion compensation units 36a through 36d should suppress excursions above the signal magnitude threshold of the associated amplifiers 38a through 38d without violating the performance requirements parameters of the communication system (e.g. the error vector magnitude parameters of a LTE communication system). Since performance requirements parameters of a communication system are based upon the communication signals input into the precoder 32, the excursion compensation units 36a, 36b, 36c, and 36d compensate for excursions after the precoding.

For example, precoded communication signal 40 (whose magnitude is illustrated in FIG. 6A) may be output from precoder 32 into excursion compensation unit 36a and destined for amplifier 38a. In the time domain, an excursion magnitude portion 44 of precoded communication signal 40 which is greater than the signal magnitude threshold 42 of amplifier 38a may be extracted in the time domain (shown in FIG. 6B). The excursion portion consists of complex values corresponding to magnitude values represented by time domain excursion magnitude portion 44. Excursion magnitude portion 44 may have an example frequency domain profile shown as frequency domain excursion signal 50 (as shown in FIG. 7A).

Because excursion magnitude portion 44 has a value of zero in the time domain for any time period that the magnitude of the precoded communication signal 40 is below the signal magnitude threshold 42 (as shown in FIGS. 6A and 6B), the associated frequency domain excursion magnitude portion 50 will have a frequency spectrum larger than the original bandwidth of the precoded communication signal 40. In other words, since there are portions of the excursion magnitude portion 44 that are zero in the time domain, the frequency characteristics of the excursion magnitude portion 50 may include sideband frequency noise components that are outside of the original frequency domain bandwidth of the precoded communication signal 40. Accordingly, frequency domain excursion signal 50 may be subjected to a bandpass filter to generate frequency domain excursion signal 52 (shown in FIG. 7B) from frequency domain excursion signal 50 which eliminates signals in frequencies that were outside of the original bandwidth of precoded communication signal 40. The frequency spectrum of excursion signal 52 spans and corresponds to all of the frequency domain subchannels that were modulated in encoders/modulators 30a and selectively mixed together by precoder 32, where the excursion magnitude portion 50 corresponded to time intervals where signal magnitudes were greater than the signal magnitude thresholds 42 of the associated amplifiers 38a, 38b, 38c, or 38d. In embodiments, signal magnitude thresholds may be dynamic and/or may be different for each of the amplifiers of the plurality of amplifiers.

The sideband frequencies which were filtered out from frequency domain excursion signal 50 to generate frequency domain excursion signal 52 are noise which should be eliminated from the communication system. When this noise is filtered out by a bandpass filter, a portion of the original signal power of excursion magnitude portion 44 is reduced. In embodiments, time domain scaling of excursion signal 50 prior to mapping to the frequency domain may be implemented to accommodate for the attenuation due to the band pass filtering. In other embodiment, time domain scaling may not be necessary if attenuation due to bandpass filtering is accommodated in the frequency domain scaling of the subchannels.

FIG. 7C illustrates frequency domain scaling of excursion signal 52 of subchannels 54a through 54h. Only eight subchannels 54a through 54h are illustrated for simplicity of explanation. However, communication systems may have tens or hundreds or thousands of subchannels, which are sometimes referred to as subcarriers by those of ordinary skill in the art. The frequency domain scaling of subchannels may be based on the precoding parameters of that subchannel, the performance requirements parameters of the communication signals input into precoder 32, and the power levels of the subchannels input into precoder 32. The frequency domain scaled excursion signals 54a through 54h may then be converted back to the time domain into a complex waveform whose magnitude is substantially similar to excursion magnitude waveform 44 (shown in FIG. 6B). In other words, the frequency scaled excursion signal should have time domain characteristics so that when excursion portion 44 is subtracted from the original signal 40, the magnitude of the resulting waveform 46 is below the signal magnitude threshold 42 of an associated amplifier.

The frequency domain scaled excursion signals 54a through 54h (illustrated in example FIG. 7C) should have frequency scaled characteristics which limit the frequency domain noise to permissible levels of a communication signal in accordance with performance requirements parameters. At the same time, the time domain characteristics of the frequency scaled excursion signal 44 must have noise distortions that when subtracted from the original signal 40 allow the amplifier 38a to operate below its magnitude signal threshold 42. Since the subchannels in the precoded communication signals are mixed together by precoder 32 of a MIMO communication system, each subchannel for each precoded communication signal may be scaled to optimal or substantially optimal levels in order to ensure that the performance requirements parameters are satisfied when the signals are reconstructed at the input to corresponding receiver demodulators, so that the amount of noise introduced does not exceed the performance requirements parameters therein imposed. Embodiments relate to the frequency domain scaling of subchannels 54a through 54h such that performance requirements parameters are satisfied and the scaled excursion signal 44 subtracted from precoded communication signal 40 results in an excursion compensated precoded communication signal that is below the signal magnitude threshold 42 of the associated amplifiers 38a through 38d.

FIG. 7C illustrates an example scaled frequency domain subchannels output from excursion compensation unit 36a, in accordance with embodiments. Although only eight subchannels 54a through 54h are illustrated for simplicity, those skill in the art will appreciate that any number of frequency distinguishable subchannels are possible (e.g. LTE communication systems can have thousands of subchannels). For the purposes of illustration, subchannel 54a may be at frequency $f_1$, subchannel 54b may be at frequency $f_2$, subchannel 54c may be at frequency $f_3$, subchannel 54d may be at frequency $f_4$, subchannel 54e may be at frequency $f_5$, subchannel 54f may be at frequency $f_6$, subchannel 54g may be at frequency $f_7$, and subchannel 54h may be at frequency $f_8$. For simplicity of illustration, FIG. 7C only illustrates the frequency domain scaling of multiple subchannels for one of the excursion compensation units 36a through 36d.

Example FIGS. 8A through 8G illustrate a frequency domain scaling unit in relation to a zero padding unit and a tail compensation unit, in accordance with embodiments.

Figure 8A:
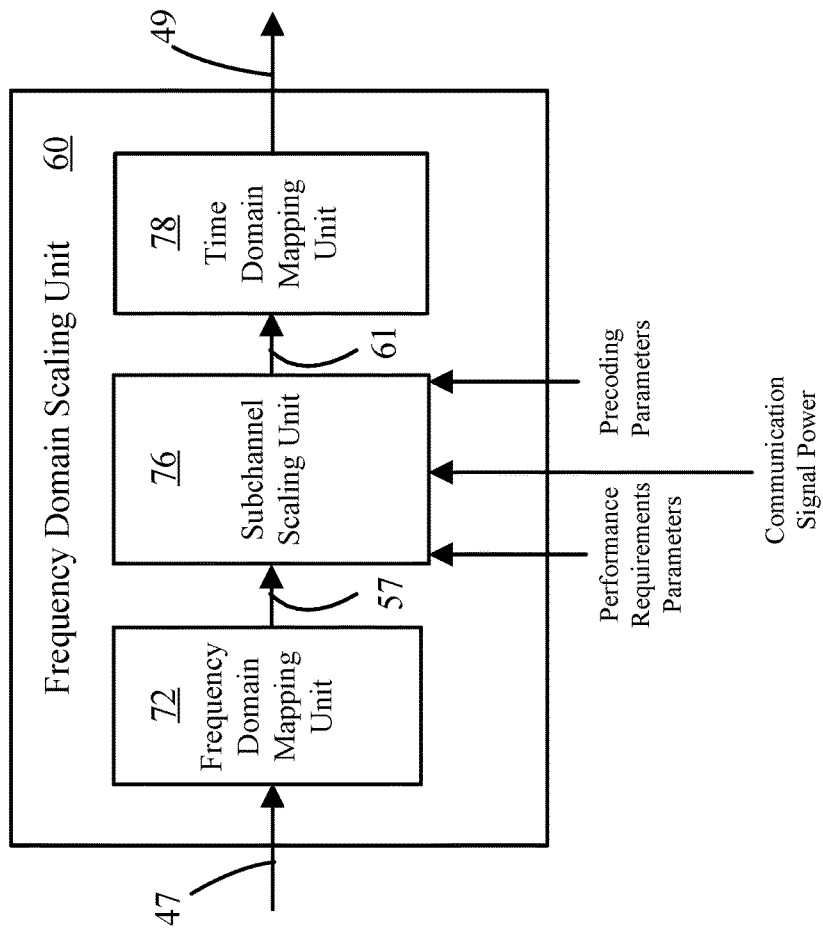

Example FIG. 8A illustrates frequency domain scaling unit 60, in accordance with embodiments. Extracted excursion signal 47 (whose magnitude is illustrated as example waveform 44 in FIG. 6B) output from excursion extraction unit 58 may be input into frequency domain scaling unit 60. Extracted excursion signal 47 may be mapped to the frequency domain in frequency domain mapping unit 72 to generate frequency domain excursion signal 57 (illustrated as example frequency domain signal 50 in FIG. 7A). In embodiments, frequency domain mapping unit 72 may use a fast Fourier transform (FFT) or any other technique appreciated by those skilled in the art.

The frequency domain excursion signal 57 output from frequency domain mapping unit 72 may be input into subchannel scaling unit 76, in accordance with embodiments. In embodiments, the subchannels in the frequency domain excursion signal 61 (e.g. example subchannels 54a through 54h illustrated in FIG. 7C) may be scaled according to the performance requirements parameters of the communication system, the power level of communication signals input into precoder 32, and the precoding parameters used in precoder 32. The subchannel scaling unit 76 introduces noise at levels that satisfy a communication system's performance requirements parameters in the respective subchannels into the corresponding receiver demodulator, while eliminating the excursion in the time domain precoded communication signal 40 that is above the signal magnitude threshold 42 (illustrated in example waveform 46 in FIG. 6C).

Frequency domain scaled subchannels 61 (illustrated as example subchannels 54a through 54h in FIG. 7C) are output from subchannel scaling unit 76. The frequency domain scaled subchannels 61 are mapped back to the time domain in time domain mapping unit 78 to generate a time domain channel scaled signal 49 having a substantially similar waveform as the extracted excursion waveform 53 (whose magnitude is illustrated as example extracted signal 44 in FIG. 6B). The difference between extracted excursion waveform 53 and the time domain channel scaled signal 49 is that in the time domain channel scaled signal 49 subchannel frequency components are scaled to satisfy the performance requirements parameters of a communication system. The time domain channel scaled signal 49 may be subtracted from the delayed first precoded communication signal 41 such that the associated amplifier 38 operates below the signal magnitude threshold 42. In embodiments, mapping to the time domain using time domain mapping unit 78 may be performed by an inverse fast Fourier transform (IFFT).

Figure 8B:
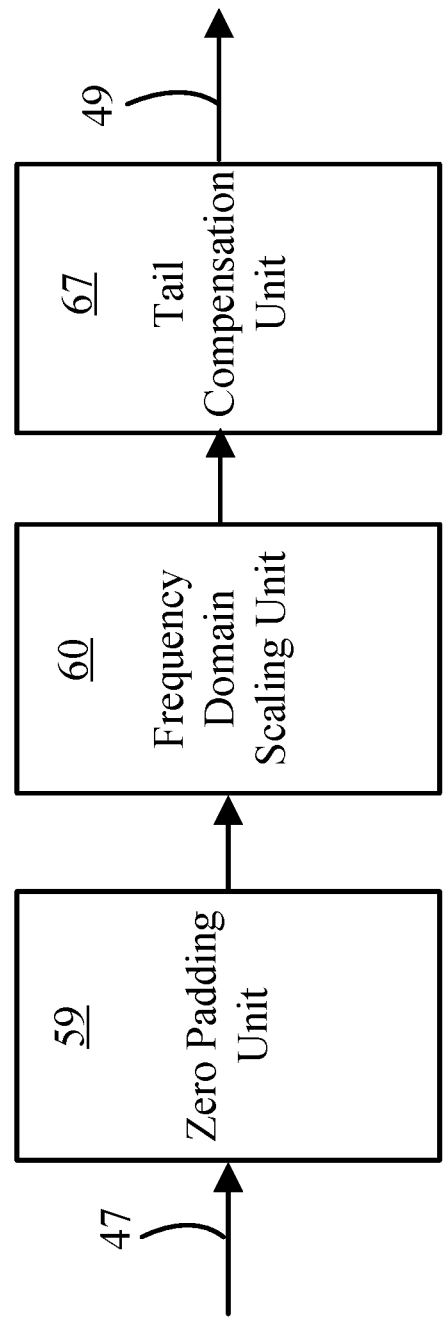

Example FIG. 8B illustrates zero padding unit 59 and tail compensation unit 67 disposed in relation to frequency domain scaling unit 60, in accordance with embodiments. Signal 47 may be output from time domain excursion generation unit 58 and may be coupled directly or indirectly to zero padding unit 59, in accordance with embodiments. In embodiments, the output of zero padding unit 59 may be output directly or indirectly to frequency domain scaling unit 60. In embodiments, the output of frequency domain scaling unit 60 may be output directly or indirectly to tail compensation unit 67. Although (for illustrative purposes) example FIG. 8B illustrates signals directly between zero padding unit 59 and tail compensation unit 67, embodiments relate to signals being indirectly communicated. For example, those skilled in the art appreciate that there may be other devices and/or components between zero padding unit

59, frequency domain scaling unit 60, and tail compensation unit 67 without departing from the spirit or scope of embodiments.

Figure 8C:
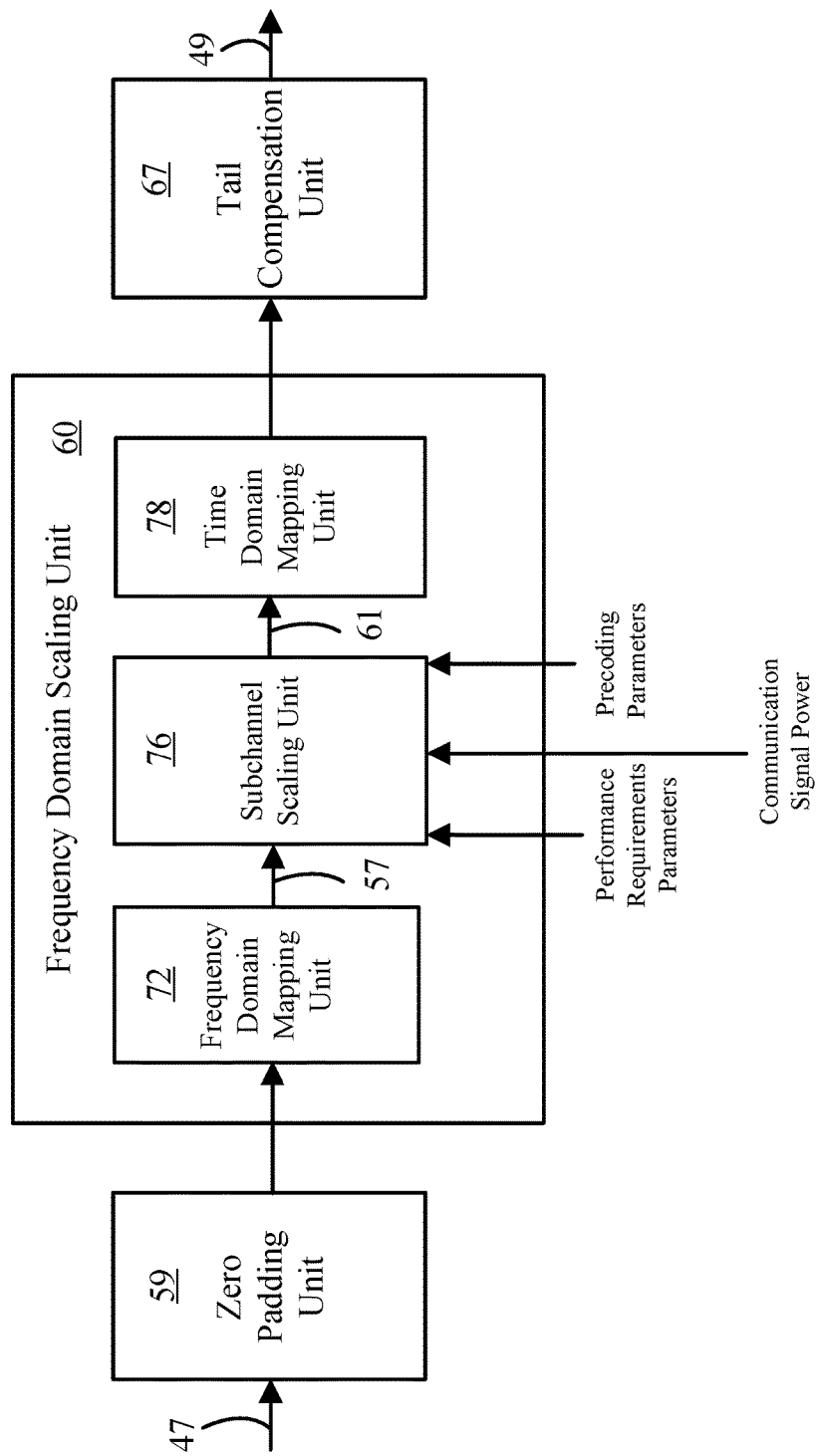

Example FIG. 8C illustrates frequency domain scaling unit 60, in accordance with embodiments. Embodiments relate to frequency domain scaling unit 60 with frequency domain mapping unit 72 receiving a signal directly or indirectly from zero padding unit 72. Embodiments relate to frequency domain scaling unit 60 with time domain mapping unit 78 outputting a signal to tail compensation unit 67.

Figure 8D:
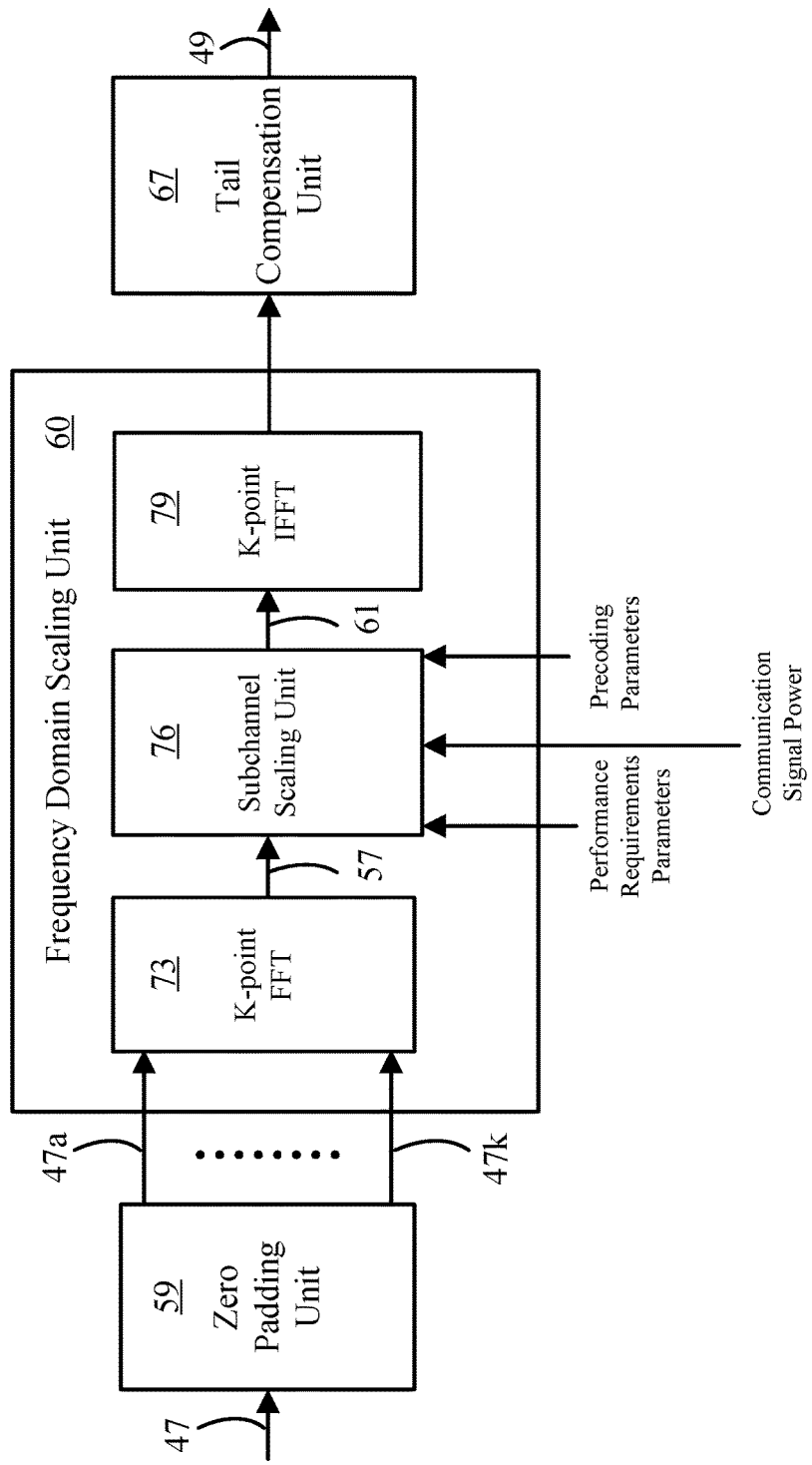

Example FIG. 8D illustrates K-point FFT 73 as a component of frequency domain mapping unit 72 and K-point IFFT as a component of time domain mapping unit 78, in accordance with embodiments. In embodiments, K is an integer equal to an integer power of two. Since fast Fourier transforms and inverse fast Fourier transforms are implemented most efficiently on data frames having a length equal to an integer power of two, K may be an integer equal to an integer power of two, in accordance with embodiments.

Figure 8E:
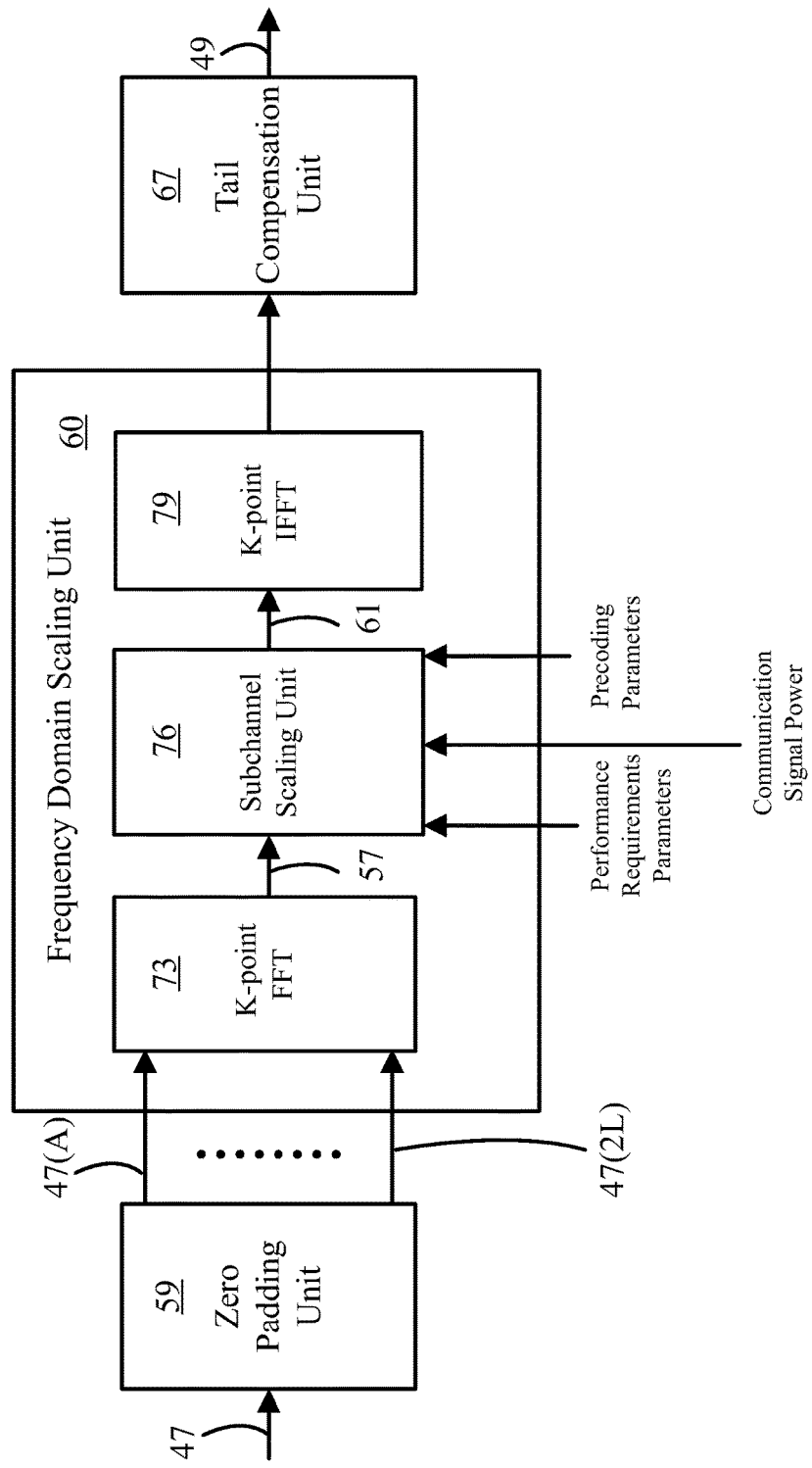

Example FIG. 8E illustrates 2L-point FFT 73 as a component of frequency domain mapping unit 72 and 2L-point IFFT as a component of time domain mapping unit 78, in accordance with embodiments. L may be an integer power of two which is implemented in FFT or IFFT operations of encoder/modulator 30. Given that the addition of a cyclic prefix (in some embodiments) adds a length less than L, then the FFT and IFFT in frequency domain scaling unit 60 may be exactly twice the length (e.g. 2L) of the FFT and IFFT lengths in encoder/modulator 30. In other words, K=2×L, in accordance with embodiments.

Example FIG. 8F illustrates zero padding unit 59, in accordance with embodiments. In embodiments, signal 47 from time domain excursion generation unit 58 may be directly or indirectly received by zero padding unit 59. In embodiments, excursion receiving unit 75 may receive signal 47 have a frame length of N. N may be the length of the frame (e.g. L) output from encoder/modulator 30 plus any length added by cyclic prefix unit 33, in accordance with embodiments. N may be an integer that is not equal to a power of two. According, based on the length of N, zero pad generator 79 may append zero or nominal values N+1 to K such that the frame length input into zero padding appending unit 77 has K inputs and K is an integer power of two, in accordance with embodiments. In embodiments, zero padding appending unit 77 may output K outputs (e.g. 47(N) through 47(K) to frequency domain scaling unit 60. Since K is an integer power of two, the signal input into frequency domain scaling unit 60 can implement efficient FFT and IFFT computations, in accordance with embodiments. Those skilled in the art appreciate other implementations of zero padding unit 59 that are different from that illustrated in example FIG. 8F that do not depart from the spirit and scope of embodiments. In other words, FIG. 8F illustrates just one example implementation of the embodiments.

Figure 8G:
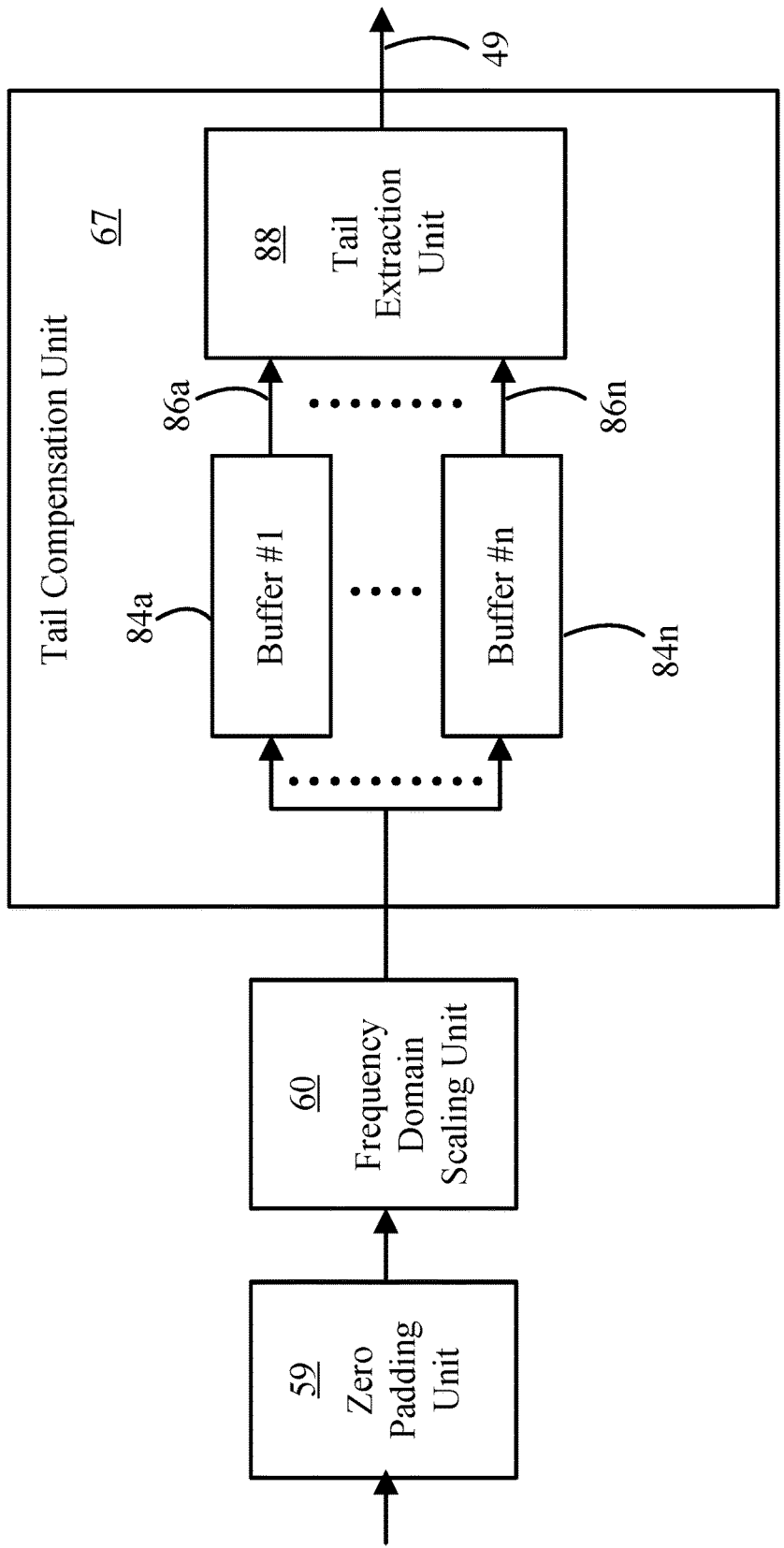

Example FIG. 8G illustrates tail compensation unit 67, in accordance with embodiments. In embodiments, frequency domain scaling unit 60 outputs a signal having a frame length K. This signal is input into at least two buffers (e.g. buffer 84*a* and buffer 84*n*). Buffer 84*a* outputs a signal 86*a* to tail extraction unit 88 and buffer 84*n* outputs signal 86*n* to tail extraction unit 88, in accordance with embodiments. Since the original signal input into zero padding unit 59 had a length N (which may not be an integer power of two), tail extraction unit 88 may discard data in frames N+1 to K in order to produce a signal having the same frame length as that input into zero padding unit 59, in accordance with embodiments. Since the signal output from tail compensation unit 67 will ultimately be subtracted from an original signal (e.g. D41), tail extraction unit 88 discards the excess data in a frame that was previously added for computational efficiency of frequency domain scaling unit 60, in accordance with embodiments. Those skilled in the art appreciate other implementations of tail compensation unit 88 that are different from that illustrated in example FIG. 8G that do not depart from the spirit and scope of embodiments. In other words, FIG. 8G illustrates just one example implementation of the embodiments.

Example FIGS. 9A through 9H illustrate a frequency domain scaling unit in relation to an interpolation unit and a decimation unit, in accordance with embodiments.

Figure 9B:
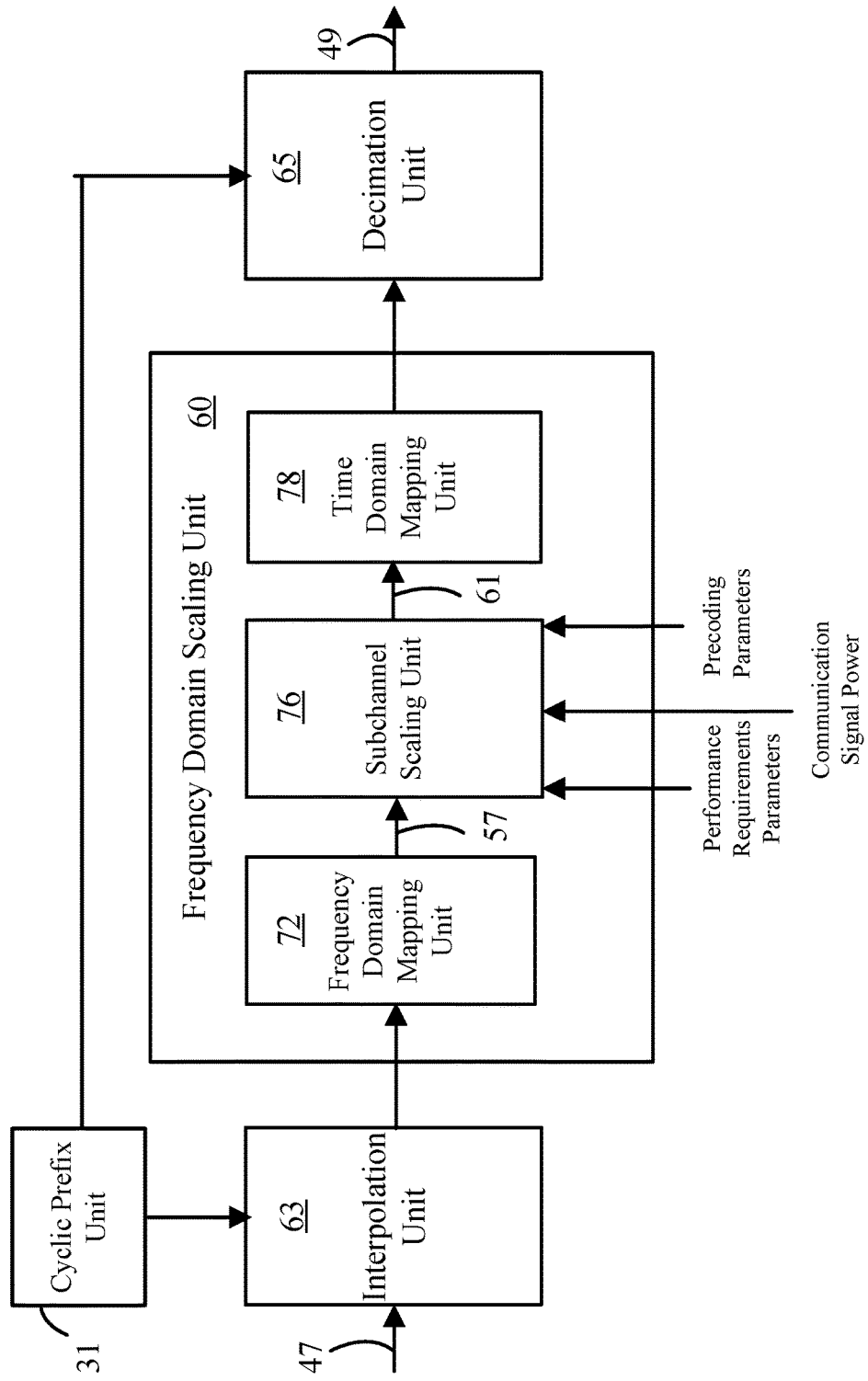

Example FIGS. 9A and 9B illustrate interpolation unit 63 and decimation unit 65 receiving feedback from cyclic prefix unit 31, in accordance with embodiments. In embodiments, in order to implement efficient FFT and IFFT processing in frequency domain scaling unit 60, interpolation unit 63 may sample signal 47 at a rate that outputs a frame having a data length that is an integer power of two. A sample rate of interpolation unit 63 may be variable and may be a factor of both the length of the original frame and the length of the added cyclic prefix. Likewise, decimation unit 65 should decimate the signal output from frequency domain scaling unit 60 so that the signal 49 output from decimation unit 65 has the same frame length as signal 47 input into interpolation unit 63. Those skilled in the art appreciate other implementations may be different from that illustrated in example FIGS. 9A and 9B that do not depart from the spirit and scope of embodiments. In other words, FIGS. 9A and 9B illustrate just one example implementation of the embodiments.

Figure 9C:
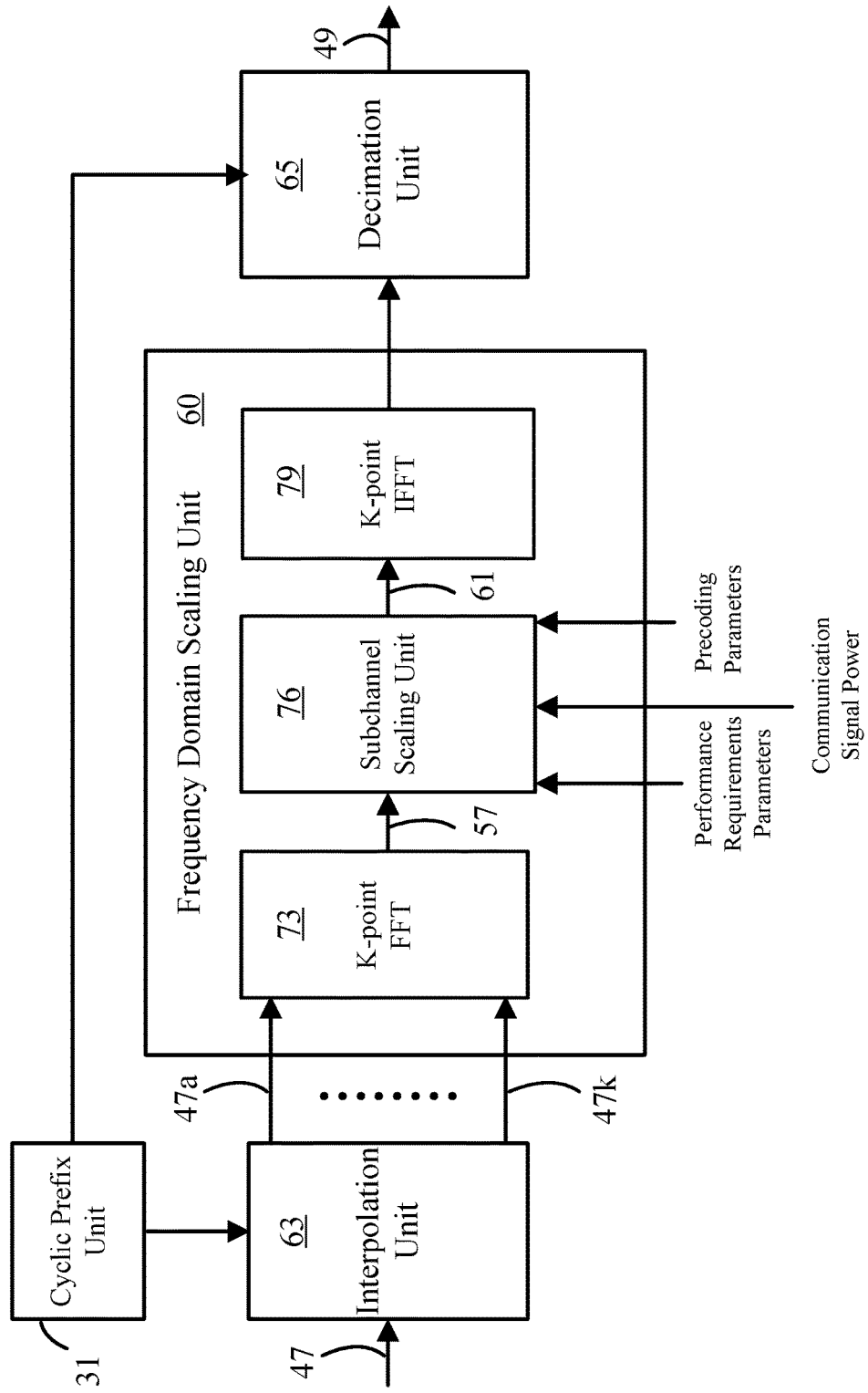
Figure 9D:
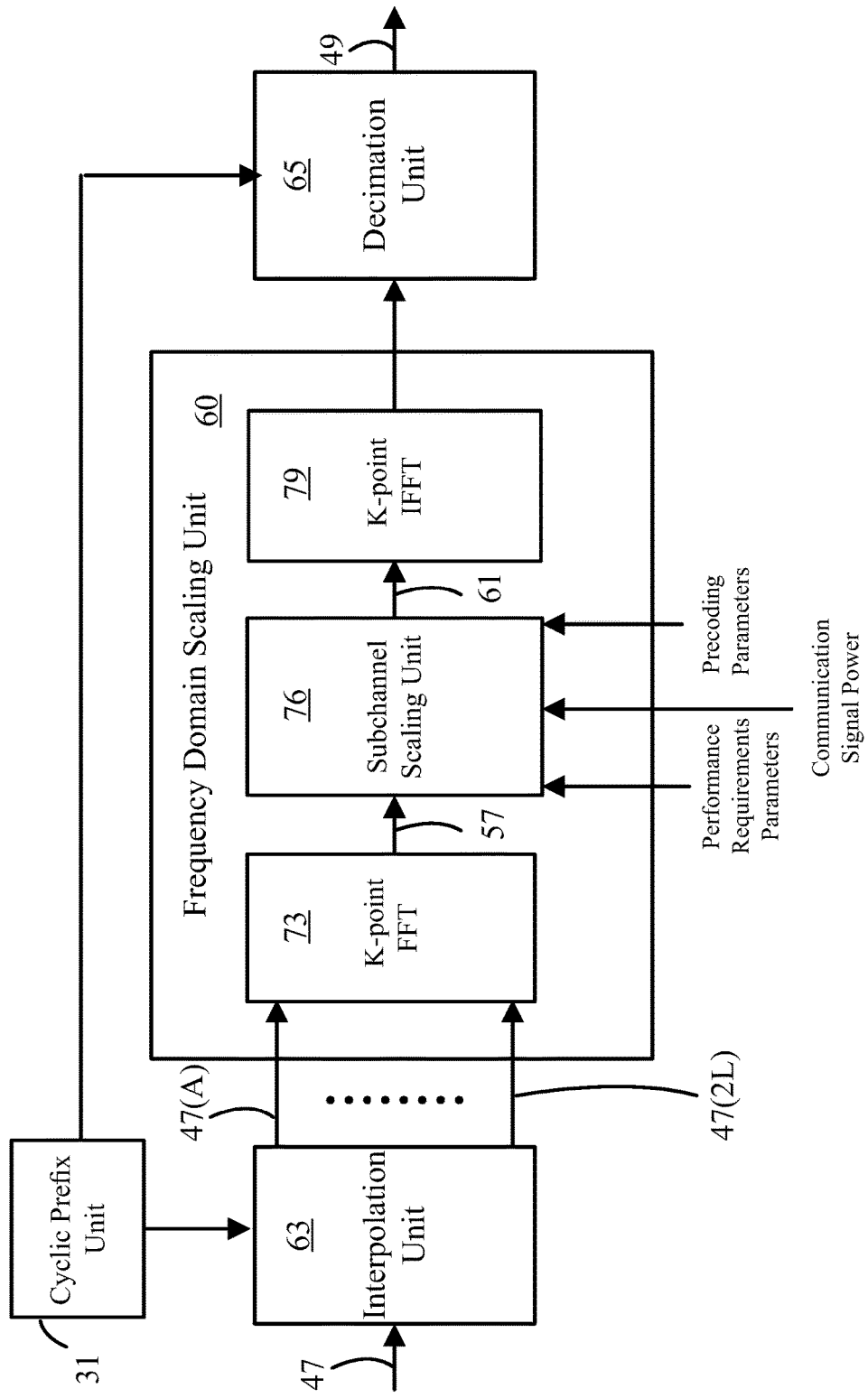

Example FIGS. 9C and 9D illustrate that frequency domain scaling unit 60 may include a K-point FFT 73 and K-point IFFT 79, in accordance with embodiments. K may be an integer that is an integer power of two, in accordance with embodiments. In embodiments, K-point FFT 73 and K-point IFFT 79 may be 2L-point FFT 73 and 2L-point IFFT 79, such that the length of a data frame processed by frequency domain scaling unit is an integer multiple (e.g. 2L) of the length of the FFT and/or IFFT processing length in encoder/decoder 30. FIGS. 9C and 9D illustrate just one example implementation of the embodiments.

Figure 9E:
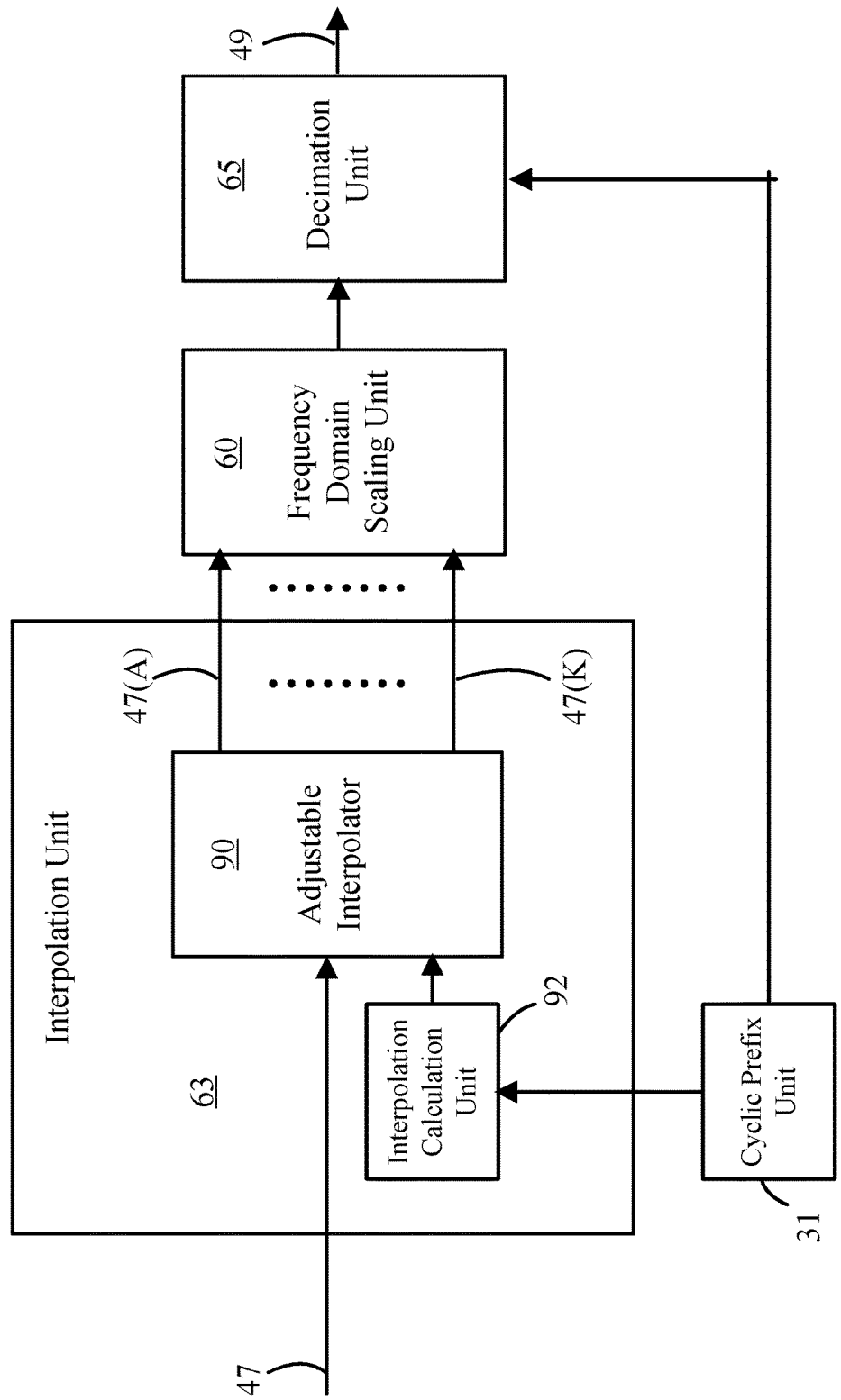
Figure 9F:
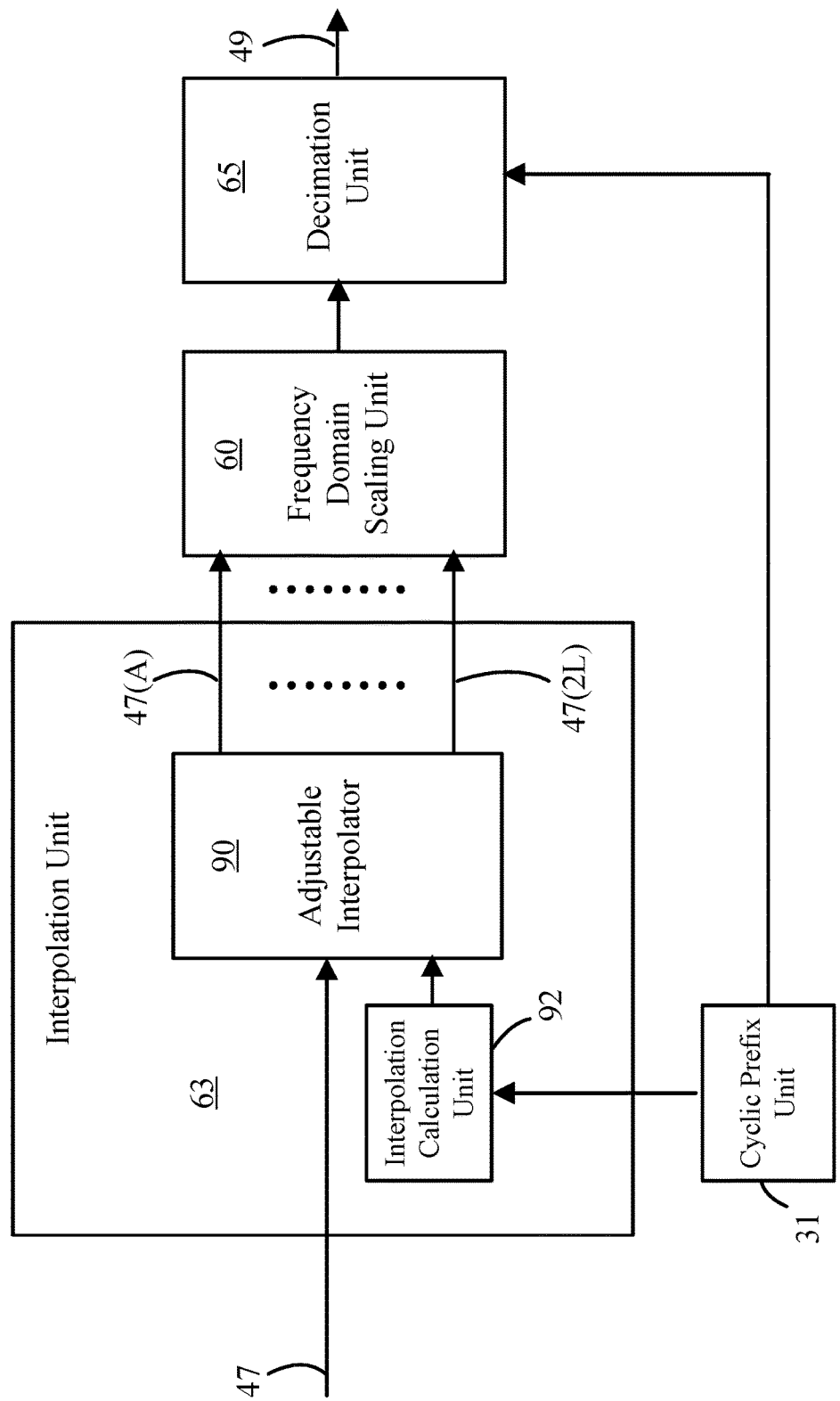

Example FIGS. 9E and 9F illustrate interpolation unit 63 with interpolation calculation unit 92 and adjustable interpolator 90, in accordance with embodiments. Signal 47 may be received by interpolation unit 63 from time domain excursion generation unit 58. Since signal 47 may have a cyclic prefix added, signal 47 may have a frame length that is not an integer power of two. Interpolation calculation unit 92 may receive feedback from cyclic prefix unit 31 as to the length of the cyclic prefix and calculate the rate of interpolation needed to generate signals 47(A) through 47(K) that have a length that is an integer power of two, such that these signals can be efficiently processed by frequency domain scaling unit 60. An output of interpolation calculation unit 92 may be output to adjustable interpolator 90, which adjusts the interpolation rate to generate a data frame having a length that is an integer power of two. In embodiments illustrated in FIG. 9F, adjustable interpolation unit 90 output signals 47(A) to 47(2L) such that the data length is exactly twice the length of the FFT and/or IFFT processing length in encoder/decoder 32. FIGS. 9E and 9F illustrate just one example implementation of the embodiments. In embodiments, interpolation calculation unit 63 may calculate the interpolation rate as a value K/(L+N) times the sampling rate of the received communication signal.

Figure 9G:
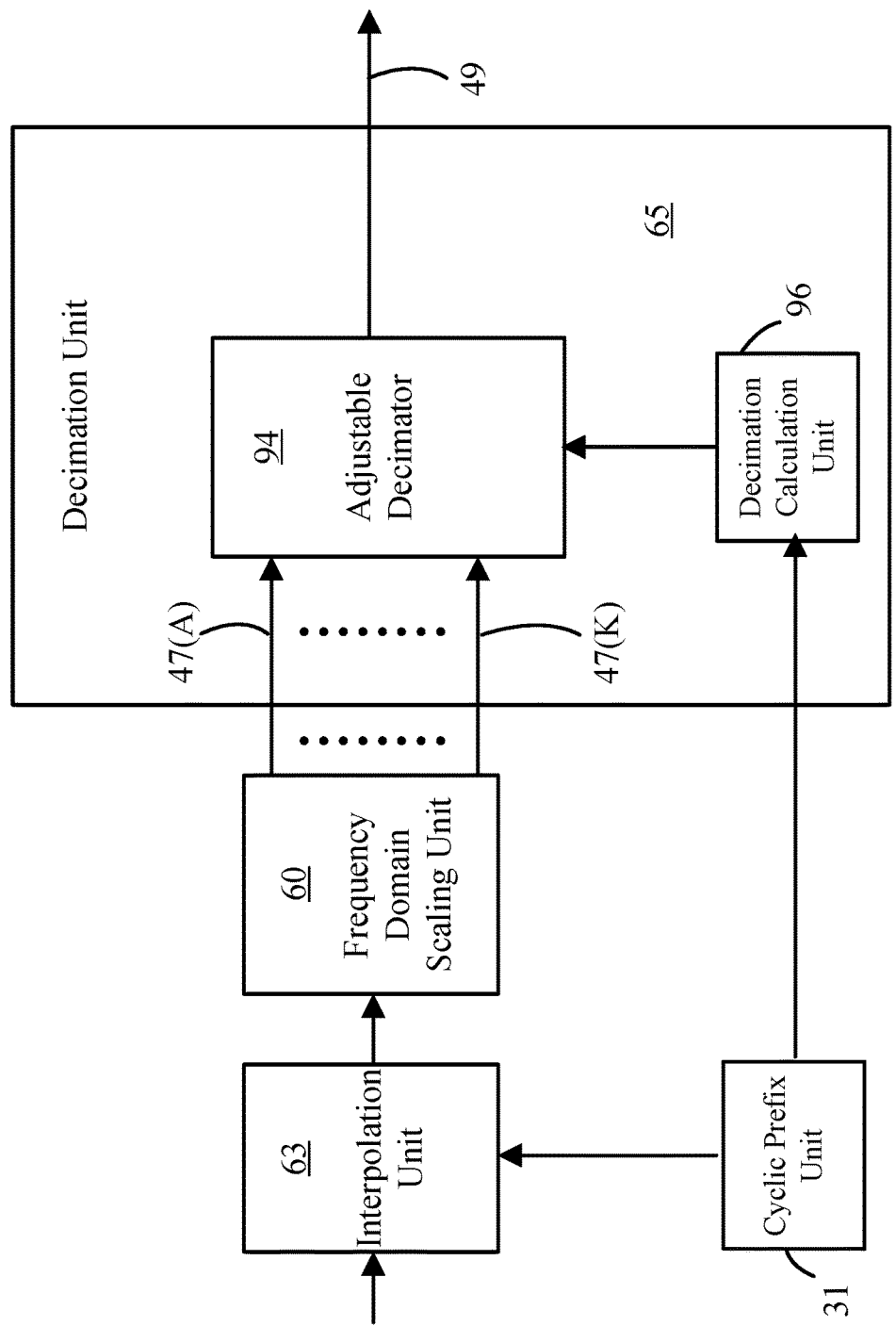
Figure 9H:
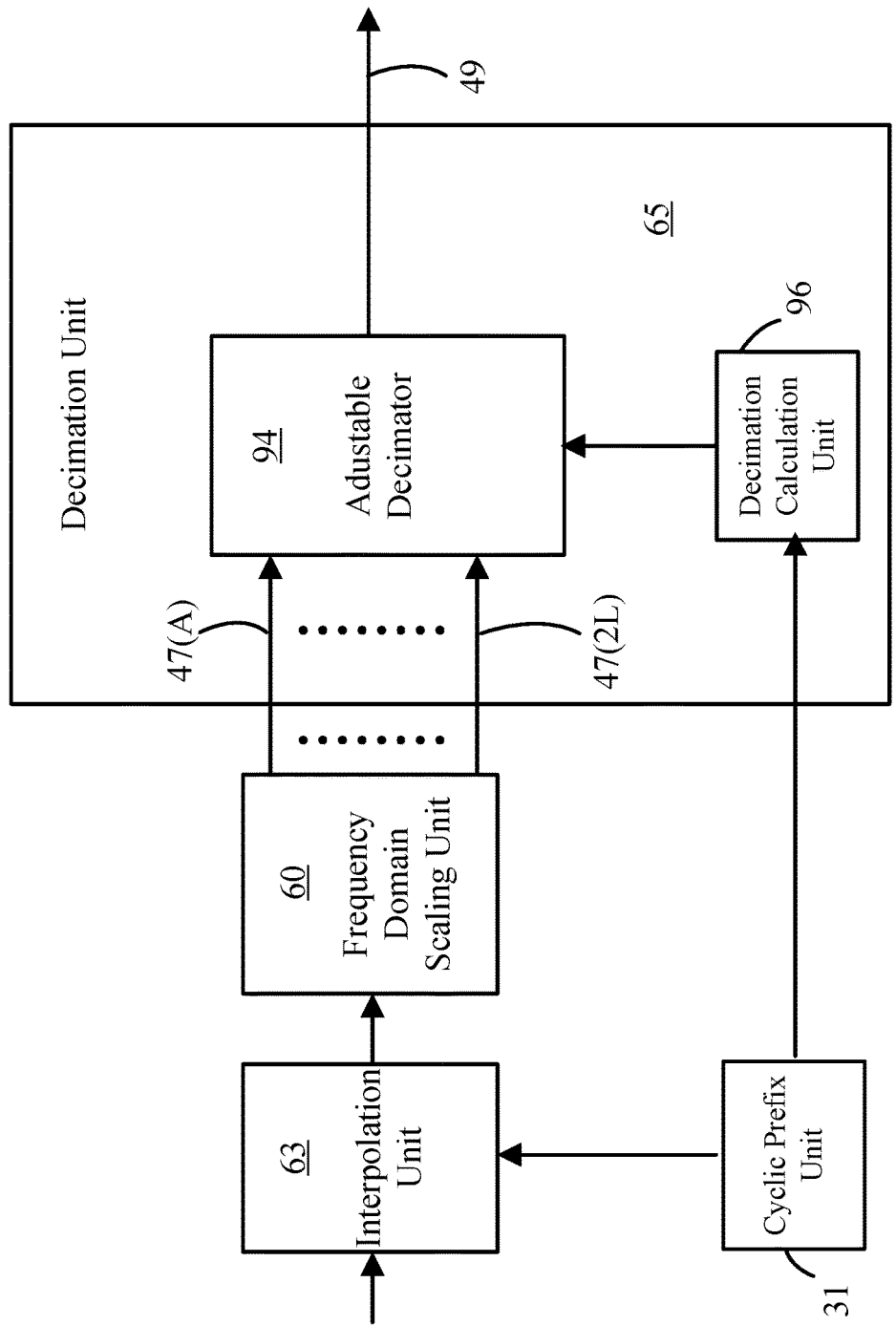

Example FIGS. 9G and 9H illustrate decimation unit 65 with decimation calculation unit 96 and adjustable decimator 94, in accordance with embodiments. Signals 47(A) through 47(K) may be received by decimation unit 65 from frequency domain scaling unit 60. Decimation calculation unit 96 may receive feedback from cyclic prefix unit 31 as to the length of the cyclic prefix and calculate the rate of decimation needed to generate signal 49 that has a frame length equal to that input into interpolation unit 63. An output of decimation calculation unit 96 may be output to adjustable decimator 94, which adjusts the decimation rate to generate a data frame that has a frame length equal to that input into interpolation unit 63. In embodiments illustrated in FIG. 9H, adjustable decimator unit 94 outputs signal 49 by decimating signals 47(A) to 47(2L) such that the data length is exactly twice the length of the FFT and/or IFFT processing length in encoder/decoder 32. FIGS. 9G and 9H illustrate just one example implementation of the embodiments. In embodiments, decimation unit 65 may calculate the decimation rate as a value (L+N)/K times the sampling rate of the received communication signal and/or the inverse proportion of the interpolation rate calculated by interpolation unit 63.

Although embodiments and their advantages have been described in detail, it should be understood that various changes, substitutions and alterations can be made herein without departing from the spirit and scope of the disclosed as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   receiving a communication signal;
   splitting the communication signal into a first communication signal and a second communication signal;
   zero padding the second communication signal; and
   excursion compensating the first communication signal with the second communication signal to generate an excursion compensated signal, wherein the excursion compensating is performed by fast Fourier transform logic;
   wherein:
   the received communication signal comprises at least one cyclic prefix;
   the zero padding of the second communication signal is dependent on the length of said at least one cyclic prefix;
   the method is performed in an excursion compensation unit;
   at least one cyclic prefix unit generates said at least one cyclic prefix prior to said receiving the communication signal; and
   the excursion compensation unit receives information on the length of said at least one cyclic prefix from said at least one cyclic prefix unit.

2. The method of claim 1, wherein the zero padding adds zeros to each data frame of the second communication signal such that the total number of bits in each data frame of the second communication signal is an integer power of the number two.

3. The method of claim 2, wherein the zero padding maximizes computational efficiency of the fast Fourier transform logic.

4. The method of claim 1, wherein the received communication signal comprises at least one modulated signal and said at least one cyclic prefix.

5. The method of claim 4, wherein said at least one modulated signal comprises at least one encoded signal.

6. The method of claim 5, wherein said at least one modulated signal and said at least one encoded signal are generated prior to said at least one cyclic prefix being appended to said at least one modulated signal.

7. The method of claim 5, wherein said at least one encoded signal is generated in at least one of at least one encoder or at least one modulator.

8. The method of claim 1, wherein:
   said at least one modulated signal is generated in at least one modulator;
   said at least one cyclic prefix is generated in at least cyclic prefix unit;
   the excursion compensated signal is generated in at least one excursion compensation unit;
   at least one power amplifier is configured to amplify the excursion compensated signal for transmission by at least one antenna.

9. The method of claim 8, wherein said at least one modulator, said at least one cyclic prefix unit, the excursion compensation unit or said at least one power amplifier is comprised in a wireless transmitter.

10. The method of claim 9, wherein the wireless transmitter is comprised in a mobile device.

11. The method of claim 9, wherein the wireless transmitter is comprised in a base station.

12. The method of claim 8, wherein:
    said at least one modulator comprises a L-point inverse fast Fourier transform logic having a computational length of L;
    the excursion compensation unit comprises at least one K-point fast Fourier transform logic having a computational length of K; and
    the excursion compensation unit comprises at least one K-point inverse fast Fourier transform logic having the computational length of K.

13. The method of claim 12, wherein the computational length of K is an integer power of two, and wherein the computational length of K is larger than the computational length of L.

14. The method of claim 8, wherein the at least one excursion compensation unit comprises a frequency domain scaling unit configured to scale in a frequency domain a plurality of subchannels in the second communication signal.

15. The method of claim 14, wherein:
    the scaling in the frequency domain is performed after said at least one K-point fast Fourier transform logic; and
    the scaling in the frequency domain is performed prior to said at least one K-point inverse fast Fourier transform logic.

16. The method of claim 1, wherein the received communication signal is a precoded communication signal.

17. The method of claim 16, wherein the precoded communication signal is a MIMO communication signal.

18. The method of claim 17, wherein the MIMO communication signal is an LTE communication signal.

19. The method of claim 1, comprising:
receiving a plurality of communication signals;
precoding the plurality of communication signals into a plurality of precoded communication signals comprising the received communication signal;
excursion compensating the plurality of precoded communication signals into a plurality of excursion compensated precoded communication signals, wherein the excursion compensating is based on performance requirements parameters of a communication system, and wherein the excursion compensating is based on parameters of the precoding the plurality of communication signals.

20. The method of claim 1, comprising:
receiving a plurality of communication signals at a precoder;
precoding the plurality of communication signals at the precoder to output a plurality of precoded communication signals comprising the received communication signal;
receiving each of the plurality of precoded communication signals at a different corresponding excursion compensation unit of a plurality of excursion compensation units;
excursion compensating the received communication signal at the corresponding excursion compensation unit to output the excursion compensated signal, wherein the excursion compensating comprises:
extracting in a time domain an excursion portion of the received communication signal,
scaling in a frequency domain a plurality of subchannels of the excursion portion based on performance requirements parameters of a communication system and based on parameters of the precoding of the plurality of communication signals to generate a scaled excursion portion, and
subtracting the scaled excursion portion from the received communication signal to generate the excursion compensated precoded signal.

21. The method of claim 20, wherein:
the extracting is performed in a time domain excursion generation unit;
the scaling is performed in a frequency domain scaling unit;
the zero padding is performed in a zero padding unit between the time domain excursion generation unit and the frequency domain scaling unit.

22. The method of claim 21, wherein the zero padding unit comprises:
an excursion receiving unit configured to receive N symbols of a N-length symbol frame of the received communication signal;
a zero pad generator configured to generate zero value symbols to fill out the N-symbol frame into a K-length symbol frame, wherein the zero pad generator receives feedback from the excursion receiving unit as to the value of N; and
a zero padding appending unit configured to append the N symbols of the N-length symbol frame to the zero value symbols to generate a K-length symbol frame to be output to the frequency domain scaling unit.

23. The method of claim 21, comprising tail compensating the scaled excursion portion in a tail compensation unit after the frequency domain scaling unit and prior to the subtracting the scaled excursion portion from the received communication signal to generate the excursion compensated precoded signal.

24. The method of claim 23, wherein the tail compensation unit comprises:
at least two buffers; and
a tail extraction unit configured to discard zero padded symbols output from the frequency domain scaling unit.

25. A method comprising:
receiving an orthogonal frequency division multiplexed (OFDM) communication signal;
splitting the communication signal into a first communication signal and a second communication signal;
interpolating the second communication signal; and
excursion compensating the first communication signal with the second signal to generate an excursion compensated signal, wherein:
the received communication signal comprises at least one cyclic prefix;
the interpolating converts a first number of samples in each data frame of the second communication signal into a second number of samples, wherein the second number of samples is an integer power of two;
the interpolating of the second communication signal is dependent on the length of said at least one cyclic prefix;
the method is performed in an excursion compensation unit;
at least one cyclic prefix unit generates said at least one cyclic prefix prior to said receiving the electrical data signal; and
the excursion compensation unit receives information on the length of said at least one cyclic prefix from said at least one cyclic prefix unit.

26. The method of claim 25, wherein the received communication signal comprises at least one modulated signal and said at least one cyclic prefix.

27. The method of claim 26, wherein said at least one modulated signal comprises at least one encoded signal.

28. The method of claim 27, wherein said at least one modulated signal and said at least one encoded signal are generated prior to said at least one cyclic prefix being appended to said at least one modulated signal.

29. The method of claim 27, wherein said at least one encoded signal is generated in at least one of at least one encoder or at least one modulator.

30. The method of claim 26, wherein:
said at least one modulated signal is generated in at least one modulator;
said at least one cyclic prefix is generated in at least cyclic prefix unit;
the excursion compensated signal is generated in at least one excursion compensation unit;
at least one power amplifier is configured to amplify the excursion compensated signal for transmission by at least one antenna.

31. The method of claim 30, wherein said at least one modulator, said at least one cyclic prefix unit, the excursion compensation unit or said at least one power amplifier is comprised in a wireless transmitter.

32. The method of claim 31, wherein the wireless transmitter is comprised in a mobile device.

33. The method of claim 31, wherein the wireless transmitter is comprised in a base station.

34. The method of claim 30, wherein:
said at least one modulator comprises a L-point inverse fast Fourier transform logic having a computational length of L;
the excursion compensation unit comprises at least one K-point fast Fourier transform logic having a computational length of K; and
the excursion compensation unit comprises at least one K-point inverse fast Fourier transform logic having the computational length of K.

35. The method of claim 34, wherein the computational length of K is an integer power of two, and wherein the computational length of K is larger than the computational length of L.

36. The method of claim 30, wherein the at least one excursion compensation unit comprises a frequency domain scaling unit configured to scale in a frequency domain a plurality of subchannels in the second communication signal.

37. The method of claim 36, wherein:
the scaling in the frequency domain is performed after said at least one K-point fast Fourier transform logic; and
the scaling in the frequency domain is performed prior to said at least one K-point inverse fast Fourier transform logic.

38. The method of claim 25, wherein the received communication signal is a precoded communication signal.

39. The method of claim 38, wherein the precoded communication signal is a MIMO communication signal.

40. The method of claim 39, wherein the MIMO communication signal is an LTE communication signal.

41. The method of claim 25, comprising:
receiving a plurality of OFDM communication signals;
precoding the plurality of communication signals into a plurality of precoded communication signals comprising the received communication signal;
excursion compensating the plurality of precoded communication signals into a plurality of excursion compensated precoded communication signals, wherein the excursion compensating is based on performance requirements parameters of a communication system, and wherein the excursion compensating is based on parameters of the precoding the plurality of communication signals.

42. The method of claim 29, comprising:
receiving a plurality of OFDM communication signals at a precoder;
precoding the plurality of communication signals at the precoder to output a plurality of precoded communication signals comprising the received communication signal;
receiving each of the plurality of precoded communication signals at a different corresponding excursion compensation unit of a plurality of excursion compensation units;
excursion compensating the received communication signal at the corresponding excursion compensation unit to output the excursion compensated signal, wherein the excursion compensating comprises:
extracting in a time domain an excursion portion of the received communication signal,
scaling in a frequency domain a plurality of subchannels of the excursion portion based on performance requirements parameters of a communication system and based on parameters of the precoding of the plurality of communication signals to generate a scaled excursion portion, and
subtracting the scaled excursion portion from the received communication signal to generate the excursion compensated precoded signal.

43. The method of claim 42, wherein:
the extracting is performed in a time domain excursion generation unit;
the scaling is performed in a frequency domain scaling unit;
the interpolating is performed in an interpolation unit between the time domain excursion generation unit and the frequency domain scaling unit.

44. The method of claim 43, wherein the interpolation unit comprises:
an interpolation calculation unit configured to receive feedback from a cyclic prefix unit;
an adjustable interpolator configured to perform the interpolating at a rate based on feedback received from the interpolation calculation unit.

45. The method of claim 44, wherein:
a length of fast fourier transform logic in the excursion compensation is an integer K;
a length of an inverse fast fourier transform logic of a modulator that modulated the received communication signal is an integer L;
a length of a cyclic prefix generated by the cyclic prefix unit is an integer N; and
the interpolation calculation unit calculates the rate of the adjustable interpolator based on a value K/(L+N) times the sampling rate of the received communication signal.

46. The method of claim 43, comprising decimating the scaled excursion portion in a decimation unit after the frequency domain scaling unit and prior to the subtracting the scaled excursion portion from the received communication signal to generate the excursion compensated precoded signal.

47. The method of claim 46, wherein the decimation unit comprises:
a decimation calculation unit configured to receive feedback from a cyclic prefix unit; and
an adjustable decimator configured to perform the decimating at a rate based on feedback received from the decimation calculation unit.

48. The method of claim 47, wherein:
a length of fast fourier transform logic in the excursion compensation is an integer K;
a length of an inverse fast fourier transform logic of a modulator that modulated the received communication signal is an integer L;
a length of a cyclic prefix generated by the cyclic prefix unit is an integer N; and
the decimation calculation unit calculates the rate of the adjustable decimator based on a value (L+N)/K times the sampling rate of the received communication signal.

* * * * *